US012694550B2

(12) United States Patent
Yasarla et al.

(10) Patent No.: US 12,694,550 B2
(45) Date of Patent: Jul. 28, 2026

(54) DEPTH ESTIMATION BASED ON FEATURE RECONSTRUCTION WITH ADAPTIVE MASKING AND MOTION PREDICTION

(71) Applicant: QUALCOMM Incorporated, San Diego, CA (US)

(72) Inventors: Rajeev Yasarla, San Diego, CA (US); Hong Cai, San Diego, CA (US); Risheek Garrepalli, San Diego, CA (US); Yinhao Zhu, La Jolla, CA (US); Jisoo Jeong, San Diego, CA (US); Yunxiao Shi, San Diego, CA (US); Manish Kumar Singh, San Diego, CA (US); Fatih Murat Porikli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 251 days.

(21) Appl. No.: 18/666,502

(22) Filed: May 16, 2024

(65) Prior Publication Data

US 2025/0148633 A1 May 8, 2025

Related U.S. Application Data

(60) Provisional application No. 63/596,157, filed on Nov. 3, 2023.

(51) Int. Cl.
*G06T 7/593* (2017.01)
*G06T 7/20* (2017.01)

(52) U.S. Cl.
CPC ............... *G06T 7/593* (2017.01); *G06T 7/20* (2013.01); *G06T 2207/20084* (2013.01)

(58) Field of Classification Search
CPC . G06T 7/593; G06T 7/20; G06T 2207/20084; G06T 2207/10016; G06T 2207/20081; G06T 7/50
See application file for complete search history.

(56) References Cited

U.S. PATENT DOCUMENTS

| | | | | |
|---|---|---|---|---|
| 11,288,818 | B2 * | 3/2022 | Daniilidis | .............. G06N 3/088 |
| 11,783,500 | B2 * | 10/2023 | Casser | ..................... G06T 7/55 |
| | | | | 382/100 |
| 12,428,022 | B2 * | 9/2025 | Guizilini | ............. B60W 60/001 |

OTHER PUBLICATIONS

International Search Report and Written Opinion—PCT/US2024/053474—ISA/EPO—Jan. 31, 2025.

(Continued)

*Primary Examiner* — Phuoc Tran
(74) *Attorney, Agent, or Firm* — QUALCOMM Incorporated; Espartaco Diaz Hidalgo

(57) ABSTRACT

Systems and techniques are provided for generating depth information. For example, a process can include obtaining a first feature volume including visual features corresponding to each respective frame included in a first set of frames. A first query generator network can generate reconstruction features associated with a reconstructed feature volume corresponding to the first feature volume. Based on the first feature volume, a second query generator network can generate motion features associated with predicted future motion corresponding to the first feature volume. An initial depth prediction can be generated for each respective frame based on cross-attention between features of a depth prediction decoder, the reconstruction features, and the motion features. A refined depth prediction can be generated for each respective based on cross-attention between the initial depth prediction, the reconstruction features, and the motion features.

20 Claims, 17 Drawing Sheets

(56)                    References Cited

OTHER PUBLICATIONS

Long X., et al., "Multi-view Depth Estimation using Epipolar Spatio-Temporal Networks", 2021 IEEE/CVF Conference on Computer Vision and Pattern Recognition (CVPR), IEEE, Jun. 20, 2021, pp. 8254-8263, XP034010360, abstract, figures 1,2.

Ruhkamp P., et al., "Attention meets Geometry: Geometry Guided Spatial-Temporal Attention for Consistent Self-Supervised Monocular Depth Estimation", 2021 International Conference on 3D Vision (3DV), IEEE, Dec. 1, 2021, pp. 837-847, XP033999055, sections 3 and 3.1, figure 3.

Sayed M., et al., "SimpleRecon: 3D Reconstruction Without 3D Convolutions", arxiv.org, Cornell University Library, 201 Olin Library Cornell University Ithaca, NY 14853, Aug. 31, 2022, pp. 1-19, XP091306685, abstract, figure 2.

* cited by examiner

202

Fully Connected

204

Locally Connected

210

212

214

216

206

Convolutional

208

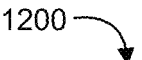

Obtain a first feature volume including visual features corresponding to each respective frame included in the first set of frames
1202

Generate, based on the first feature volume and using a first query generator network, one or more reconstruction features associated with a reconstructed feature volume corresponding to the first feature volume
1204

Generate, based on the first feature volume and using a second query generator network, one or more motion features associated with predicted future motion corresponding to the first feature volume
1206

Generate an initial depth prediction for each respective frame included in the first set of frames, based on cross-attention between features of a depth prediction decoder, the one or more reconstruction features, and the one or more motion features
1208

Generate a refined depth prediction for each respective frame included in the first set of frames, based on cross-attention between the initial depth prediction, the one or more reconstruction features, and the one or more motion features
1210

FIG. 12

DEPTH ESTIMATION BASED ON FEATURE RECONSTRUCTION WITH ADAPTIVE MASKING AND MOTION PREDICTION

CROSS-REFERENCE TO RELATED APPLICATIONS

This application claims the benefit of U.S. Provisional Patent Application No. 63/596,157, filed Nov. 3, 2023, which is hereby incorporated by reference, in its entirety and for all purposes.

FIELD OF THE DISCLOSURE

The present disclosure generally relates to depth estimation from one or more images. For example, aspects of the present disclosure relate to systems and techniques for video depth estimation using machine-learning based feature reconstruction.

BACKGROUND

Many devices and systems allow a scene to be captured by generating images (or frames) and/or video data (including multiple frames) of the scene. For example, a camera or a device including a camera can capture a sequence of frames of a scene (e.g., a video of a scene). In some cases, the sequence of frames can be processed for performing one or more functions, can be output for display, can be output for processing and/or consumption by other devices, among other uses.

An artificial neural network attempts to replicate, using computer technology, logical reasoning performed by the biological neural networks that constitute animal brains. Deep neural networks, such as convolutional neural networks, are widely used for numerous applications, such as object detection, object classification, object tracking, big data analysis, among others. For example, convolutional neural networks are able to extract high-level features, such as facial shapes, from an input image, and use these high-level features to output a probability that, for example, an input image includes a particular object.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, methods, apparatuses, and computer-readable media for performing depth completion. According to at least one illustrative example, a method of wireless communications is provided, the method comprising: obtaining a first feature volume including visual features corresponding to each respective frame included in the first set of frames; generating, based on the first feature volume and using a first query generator network, one or more reconstruction features associated with a reconstructed feature volume corresponding to the first feature volume; generating, based on the first feature volume and using a second query generator network, one or more motion features associated with predicted future motion corresponding to the first feature volume; generating an initial depth prediction for each respective frame included in the first set of frames, based on cross-attention between features of a depth prediction decoder, the one or more reconstruction features, and the one or more motion features; and generating a refined depth prediction for each respective frame included in the first set of frames, based on cross-attention between the initial depth prediction, the one or more reconstruction features, and the one or more motion features.

In another example, an apparatus is provided. The apparatus includes at least one memory and at least one processor coupled to the at least one memory and configured to: obtain a first feature volume including visual features corresponding to each respective frame included in the first set of frames; generate, based on the first feature volume and using a first query generator network, one or more reconstruction features associated with a reconstructed feature volume corresponding to the first feature volume; generate, based on the first feature volume and using a second query generator network, one or more motion features associated with predicted future motion corresponding to the first feature volume; generate an initial depth prediction for each respective frame included in the first set of frames, based on cross-attention between features of a depth prediction decoder, the one or more reconstruction features, and the one or more motion features; and generate a refined depth prediction for each respective frame included in the first set of frames, based on cross-attention between the initial depth prediction, the one or more reconstruction features, and the one or more motion features.

In another example, a non-transitory computer-readable medium is provided that includes instructions that, when executed by at least one processor, cause the at least one processor to: obtain a first feature volume including visual features corresponding to each respective frame included in the first set of frames; generate, based on the first feature volume and using a first query generator network, one or more reconstruction features associated with a reconstructed feature volume corresponding to the first feature volume; generate, based on the first feature volume and using a second query generator network, one or more motion features associated with predicted future motion corresponding to the first feature volume; generate an initial depth prediction for each respective frame included in the first set of frames, based on cross-attention between features of a depth prediction decoder, the one or more reconstruction features, and the one or more motion features; and generate a refined depth prediction for each respective frame included in the first set of frames, based on cross-attention between the initial depth prediction, the one or more reconstruction features, and the one or more motion features.

In another example, an apparatus is provided. The apparatus includes: means for obtaining a first feature volume including visual features corresponding to each respective frame included in the first set of frames; means for generating, based on the first feature volume and using a first query generator network, one or more reconstruction features associated with a reconstructed feature volume corresponding to the first feature volume; means for generating, based on the first feature volume and using a second query generator network, one or more motion features associated with predicted future motion corresponding to the first feature volume; means for generating an initial depth prediction for each respective frame included in the first set of frames, based on cross-attention between features of a depth prediction decoder, the one or more reconstruction features, and the one or more motion features; and means for generating a refined depth prediction for each respective frame included in the first set of frames, based on cross-attention between the initial depth prediction, the one or more reconstruction features, and the one or more motion features.

Aspects generally include a method, apparatus, system, computer program product, non-transitory computer-readable medium, user device, user equipment, wireless communication device, and/or processing system as substantially described with reference to and as illustrated by the drawings and specification.

Some aspects include a device having a processor configured to perform one or more operations of any of the methods summarized above. Further aspects include processing devices for use in a device configured with processor-executable instructions to perform operations of any of the methods summarized above. Further aspects include a non-transitory processor-readable storage medium having stored thereon processor-executable instructions configured to cause a processor of a device to perform operations of any of the methods summarized above. Further aspects include a device having means for performing functions of any of the methods summarized above.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims. The foregoing, together with other features and aspects, will become more apparent upon referring to the following specification, claims, and accompanying drawings.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

BRIEF DESCRIPTION OF THE DRAWINGS

The accompanying drawings are presented to aid in the description of various aspects of the disclosure and are provided solely for illustration of the aspects and not limitation thereof. So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 12 is a flowchart illustrating an example process for generating depth information from one or more images, in accordance with some examples;

DETAILED DESCRIPTION

Figure 1:
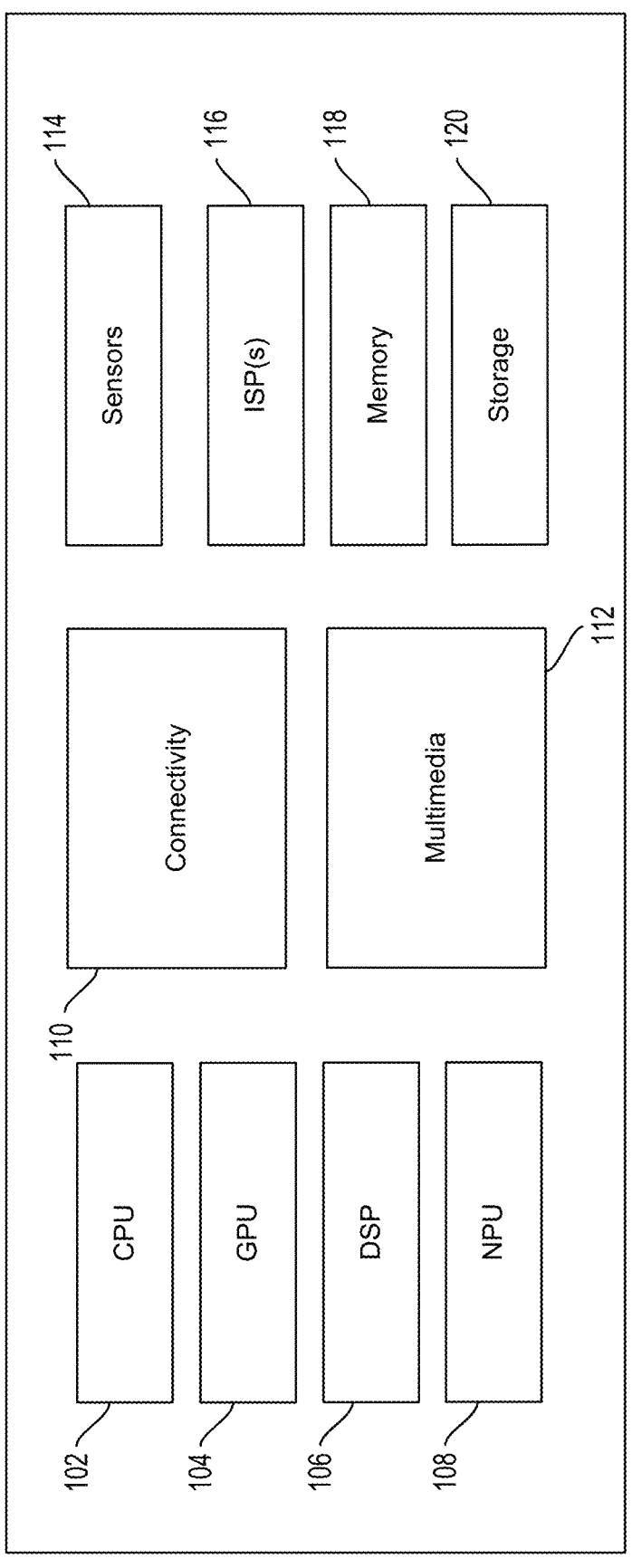
FIG. 1 illustrates an example implementation of a system-on-a-chip (SoC), in accordance with some examples.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the scope of the application as set forth in the appended claims.

As noted above, machine learning systems (e.g., deep neural network systems or models) can be used to perform a variety of tasks such as, for example and without limitation, detection and/or recognition (e.g., scene or object detection and/or recognition, face detection and/or recognition, etc.), depth estimation, pose estimation, image reconstruction, classification, three-dimensional (3D) modeling, dense regression tasks, data compression and/or decompression, and image processing, among other tasks. Moreover, machine learning models can be versatile and can achieve high quality results in a variety of tasks.

In some cases, a machine learning system can perform depth prediction based on a single image (e.g., based on receiving a single image as input). Depth prediction based on a single input image can be referred to as monocular depth estimation. Monocular depth estimation can be used for many applications (e.g., XR applications, vehicle applications, etc.). In some cases, monocular depth estimation can be used to perform occlusion rendering, for example based on using depth and object segmentation information to render virtual objects in a 3D environment. In some cases, monocular depth prediction can be used to perform 3D reconstruction, for example based on using depth information and one or more poses to create a mesh of a scene. In some cases, monocular depth prediction can be used to perform collision avoidance, for example based on using depth information to estimate distance(s) to one or more objects.

Depth estimation (e.g., such as monocular depth estimation) can be used to generate three-dimensional content (e.g., such as XR content) with greater accuracy. For example, monocular depth estimation can be used to generate XR content that combines a baseline image or video with one or more augmented overlays of rendered 3D objects. The baseline image data (e.g., an image or a frame of video) that is augmented or overlaid by an XR system may be a two-dimensional (2D) representation of a 3D scene. A naïve approach to generating XR content may be to overlay a rendered object onto the baseline image data, without compensating for 3D depth information that may be represented in the 2D baseline image data.

Depth information can be obtained from one or more depth sensors which can include, but are not limited to, Time of Flight (ToF) sensors and Light Detection and Ranging (LIDAR) sensors. Depth information can additionally, or alternatively, be obtained as a prediction or estimation that is generated based on an image input, a depth input, etc. Accurate depth information can be used for autonomous and/or self-driving vehicles to perceive a driving scene and surrounding environment, and to estimate the distances between the autonomous vehicle and surrounding environmental objects (e.g., other vehicles, pedestrians, roadway elements, etc.). Accurate depth information is needed for the autonomous vehicle to determine and perform appropriate control actions, such as velocity control, steering control, braking control, etc.

Depth information can be used for extended reality (XR) applications for functions such as indoor scene reconstruction and obstacle detection for users, among various others. Accurate depth information can be needed for improved integration of real scenes with virtual scenes and/or to allow users to smoothly and safely interact with both their real-world surroundings and the XR or VR environment. Depth information can be used in robotics to perform functions such as navigation, localization, and interaction with physical objects in the robot's surrounding environment, among various other functions. Accurate depth information can be needed to provide improved navigation, localization, and interaction between robots and their surrounding environment (e.g., to avoid colliding with obstacles, nearby humans, etc.).

As noted previously, various techniques may be used to perform depth estimation. For example, monocular depth estimation can be used to derive depth information from a single image. Monocular depth estimation may be unreliable and/or challenging to generalize. When performed for video data (e.g., a plurality of frames or images), monocular depth estimation treats each video frame independently and ignores temporal relationships and other temporal-based information that may be represented in the video data. In another example, stereo depth estimation can be used to derive depth information from a pair of stereo images (e.g., a stereo pair comprising a left and right image). Stereo imaging setups may not always be available, which can reduce the generalizability of stereo depth estimation.

Video depth estimation techniques can be used to determine depth information from a plurality of video frames. Video depth estimation techniques may be based on utilizing a cost-volume structure to derive depth information from the plurality of video frames. Calculating the cost-volume structure can be computationally expensive. Video depth estimation techniques may be based on recurrent neural networks (RNNs), which can be associated with lower performance and/or accuracy in the video depth estimation task. In some examples, a cost-volume-based video depth estimation model may require more than two frames of the video data as input, which can incur delay in the video processing and/or in the video processing pipeline that implements the cost-volume-based depth estimation model. There is a need for systems and techniques that can be used to perform video depth estimation using monocular depth models while also utilizing temporal information represented in the plurality of video frames (e.g., represented in the video data comprising the plurality of video frames, etc.). There is a further need for systems and techniques that can be used to perform video depth estimation without utilizing cost-volume based techniques, and without utilizing optical flow estimation. In some cases, there is a further need for systems and techniques that can be used to perform video depth estimation without using back-propagation to update memory features during inference.

For example, monocular depth estimation (MDE) can be used for 3D scene understanding and downstream applications thereof. While sequences of images or videos are typically available in practical scenarios, single-frame MDE methods are often utilized. Single-frame MDE methods do not utilize and/or may under-utilize spatio-temporal information that can be used to generate high-quality temporally consistent depth estimations. There is a need for high-quality temporally consistent depth estimations which may be used for advanced 3D scene understanding tasks. Aspects of the present disclosure describe systems and techniques corresponding to an approach (e.g., which may be referred to herein as "ReAPr") that can be used to generate high-quality spatial and temporal cues (e.g., as queries) that may be used to process sequences of frames simultaneously in a batch manner. Aspects of the present disclosure can utilize a reconstruction network (e.g., a reconstruction machine learning network, also referred to as "Re-Net") that utilizes adaptive masking to enhance the representation of latent features extracted from sequential frames. Aspects of the present disclosure can capture improved temporal cues utilizing a Future Prediction Network (e.g., a future prediction machine learning network, also referred to as "Pr-Net") that learns feature volume representations of future frames. The future prediction network (Pr-Net) can provide improved understanding the motion and temporal characteristics of objects and features within the scene. Aspects of the present disclosure can combine the capabilities of Re-Net and Pr-Net to generate high-quality spatial and temporal cues in the form of reconstruction and motion queries that can be used for the computation of temporally consistent, high-quality depth estimations.

Systems, apparatuses, processes (also referred to as methods), and computer-readable media (collectively referred to as "systems and techniques") are described herein for performing depth estimation for one or more images. In one illustrative example, the systems and techniques can be used to perform video depth estimation for a plurality of images (e.g., a plurality of video frames, also referred to as "video data"). In some aspects, the systems and techniques can perform video depth estimation without utilizing a cost-volume structure and/or without utilizing cost-volume-based machine learning models. In some examples, the systems and techniques can additionally perform video depth estimation without utilizing optical flow estimation and/or without utilizing backpropagation to update memory features during inference.

For example, the systems and techniques can be used to perform video depth estimation based on feature reconstruction with adaptive masking and motion prediction. One or more machine learning networks can be utilized to determine video depth information using batch processing, where corresponding depth information (e.g., depth map, etc.) is determined for each video frame included in a plurality of video frames (e.g., a batch). In some aspects, the systems and techniques can use a machine learning encoder (e.g., machine learning encoder network or sub-network) to generate a feature volume based on a plurality of input images. For example, an encoder can generate a feature volume corresponding to a plurality of input video frames of a video data (e.g., a batch of video frames).

A reconstruction network and a motion prediction network can be used to refine an initial depth prediction that is generated based on the feature volume. For example, the reconstruction network can include and/or be configured to implement a reconstruction-aware query generator. In some aspects, the reconstruction network can be trained to reconstruct an input feature volume. For example, inputs to the reconstruction network during training can be masked feature volumes, and outputs of the reconstruction network during training are corresponding completed feature volumes. In some examples, the trained reconstruction network can be used during inference to generate an enhanced feature volume corresponding to the feature volume generated by the encoder based on the batch of video frames.

A motion prediction network can include and/or be configured to implement a motion-aware query generator. The motion prediction network can also be referred to herein as a "feature prediction network" and/or a "future prediction network." The motion prediction network can be implemented as a neural network that is trained to generate features that capture key motion features. The motion-aware query features generated by the motion prediction network can be used to cross-attend features in a decoder and a refinement engine utilized by the systems and techniques described herein.

For example, the construction-aware query features (e.g., generated by and associated with the reconstruction network in processing the feature volume for the video frame batch) can be provided to a cross-attention sub-network (e.g., one or more cross-attention layers, etc.) included in a decoder network. The motion-aware query features generated by the motion prediction network can also be provided to the cross-attention sub-network of the decoder.

The decoder can use the reconstruction-aware query features and the motion-aware query features (e.g., from the reconstruction network and the motion prediction network, respectively) to cross-attend features of the video frame feature volume (e.g., the feature volume or enhanced feature volume generated corresponding to an input batch of video frames). Based on cross-attending the video frame feature volume features, the decoder can generate a corresponding plurality of initial predicted depths for each respective video frame included in the video frame batch. For example, the encoder can generate an initial depth prediction (e.g., initial predicted or estimated depth map) for each respective video frame that is represented in the feature volume provided as input to the encoder. The feature volume input to the decoder can include a respective representation for each video frame included in the input batch of video frames (e.g., the input plurality of video frames) that is used by the encoder to first generate the feature volume.

The plurality of initial depth predictions corresponding to the input video frame batch can be provided to a refinement engine (e.g., also referred to as a refinement network or refinement sub-network). The refinement engine can be configured to cross-attend features of the initial predicted depths, based on the reconstruction-aware query features and the motion-aware query features. Based on the cross-attention calculation performed by the refinement engine, a plurality of corresponding refined depth predictions can be generated for the plurality of initial depth predictions.

Various aspects of the systems and techniques will be described with reference to the figures.

FIG. 1 illustrates an example implementation of a system-on-a-chip (SOC) 100, which may include a central processing unit (CPU) 102 or a multi-core CPU, configured to perform one or more of the functions described herein. Parameters or variables (e.g., neural signals and synaptic weights), system parameters associated with a computational device (e.g., neural network with weights), delays, frequency bin information, task information, among other information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, and/or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU 102, DSP 106, and/or GPU 104. The SOC 100 may also include a sensor processor 114, image signal processors (ISPs) 116, and/or storage 120.

The SOC 100 may be based on an ARM instruction set. In an aspect of the present disclosure, the instructions loaded into the CPU 102 may comprise code to search for a stored multiplication result in a lookup table (LUT) corresponding to a multiplication product of an input value and a filter weight. The instructions loaded into the CPU 102 may also comprise code to disable a multiplier during a multiplication operation of the multiplication product when a lookup table hit of the multiplication product is detected. In addition, the instructions loaded into the CPU 102 may comprise code to store a computed multiplication product of the input value and the filter weight when a lookup table miss of the multiplication product is detected.

SOC 100 and/or components thereof may be configured to perform image processing using machine learning techniques according to aspects of the present disclosure discussed herein. For example, SOC 100 and/or components thereof may be configured to perform depth completion according to aspects of the present disclosure. In some cases, by using a graph-based neural network with a segmentation input and a depth input each associated with a same image, aspects of the present disclosure can increase the accuracy and efficiency of generating dense depth maps from an image input and a sparse depth input.

SOC 100 can be part of a computing device or multiple computing devices. In some examples, SOC 100 can be part of an electronic device (or devices) such as a camera system (e.g., a digital camera, an IP camera, a video camera, a security camera, etc.), a telephone system (e.g., a smartphone, a cellular telephone, a conferencing system, etc.), a desktop computer, an XR device (e.g., a head-mounted display, etc.), a smart wearable device (e.g., a smart watch, smart glasses, etc.), a laptop or notebook computer, a tablet computer, a set-top box, a television, a display device, a system-on-chip (SoC), a digital media player, a gaming console, a video streaming device, a server, a drone, a computer in a car, an Internet-of-Things (IoT) device, or any other suitable electronic device(s).

In some implementations, the CPU 102, the GPU 104, the DSP 106, the NPU 108, the connectivity block 110, the multimedia processor 112, the one or more sensors 114, the ISPs 116, the memory block 118 and/or the storage 120 can be part of the same computing device. For example, in some cases, the CPU 102, the GPU 104, the DSP 106, the NPU 108, the connectivity block 110, the multimedia processor 112, the one or more sensors 114, the ISPs 116, the memory block 118 and/or the storage 120 can be integrated into a smartphone, laptop, tablet computer, smart wearable device, video gaming system, server, and/or any other computing device. In other implementations, the CPU 102, the GPU 104, the DSP 106, the NPU 108, the connectivity block 110, the multimedia processor 112, the one or more sensors 114, the ISPs 116, the memory block 118 and/or the storage 120 can be part of two or more separate computing devices.

Machine learning (ML) can be considered a subset of artificial intelligence (AI). ML systems can include algorithms and statistical models that computer systems can use to perform various tasks by relying on patterns and inference, without the use of explicit instructions. One example of a ML system is a neural network (also referred to as an artificial neural network), which may include an interconnected group of artificial neurons (e.g., neuron models). Neural networks may be used for various applications and/or devices, such as image and/or video coding, image analysis and/or computer vision applications, Internet Protocol (IP) cameras, Internet of Things (IoT) devices, autonomous vehicles, service robots, among others.

Individual nodes in a neural network may emulate biological neurons by taking input data and performing simple operations on the data. The results of the simple operations performed on the input data are selectively passed on to other neurons. Weight values are associated with each vector and node in the network, and these values constrain how input data is related to output data. For example, the input data of each node may be multiplied by a corresponding weight value, and the products may be summed. The sum of the products may be adjusted by an optional bias, and an activation function may be applied to the result, yielding the node's output signal or "output activation" (sometimes referred to as a feature map or an activation map). The weight values may initially be determined by an iterative flow of training data through the network (e.g., weight values are established during a training phase in which the network learns how to identify particular classes by their typical input data characteristics).

Different types of neural networks exist, such as convolutional neural networks (CNNs), recurrent neural networks (RNNs), generative adversarial networks (GANs), multi-layer perceptron (MLP) neural networks, transformer neural networks, among others. For example, convolutional neural networks (CNNs) are a type of feed-forward artificial neural network. Convolutional neural networks may include collections of artificial neurons that each have a receptive field (e.g., a spatially localized region of an input space) and that collectively tile an input space. RNNs work on the principle of saving the output of a layer and feeding this output back to the input to help in predicting an outcome of the layer. A GAN is a form of generative neural network that can learn patterns in input data so that the neural network model can generate new synthetic outputs that reasonably could have been from the original dataset. A GAN can include two neural networks that operate together, including a generative neural network that generates a synthesized output and a discriminative neural network that evaluates the output for authenticity. In MLP neural networks, data may be fed into an input layer, and one or more hidden layers provide levels of abstraction to the data. Predictions may then be made on an output layer based on the abstracted data.

Deep learning (DL) is one example of a machine learning technique and can be considered a subset of ML. Many DL approaches are based on a neural network, such as an RNN or a CNN, and utilize multiple layers. The use of multiple layers in deep neural networks can permit progressively higher-level features to be extracted from a given input of raw data. For example, the output of a first layer of artificial neurons becomes an input to a second layer of artificial neurons, the output of a second layer of artificial neurons becomes an input to a third layer of artificial neurons, and so on. Layers that are located between the input and output of the overall deep neural network are often referred to as hidden layers. The hidden layers learn (e.g., are trained) to transform an intermediate input from a preceding layer into a slightly more abstract and composite representation that can be provided to a subsequent layer, until a final or desired representation is obtained as the final output of the deep neural network.

As noted above, a neural network is an example of a machine learning system, and can include an input layer, one or more hidden layers, and an output layer. Data is provided from input nodes of the input layer, processing is performed by hidden nodes of the one or more hidden layers, and an output is produced through output nodes of the output layer. Deep learning networks typically include multiple hidden layers. Each layer of the neural network can include feature maps or activation maps that can include artificial neurons (or nodes). A feature map can include a filter, a kernel, or the like. The nodes can include one or more weights used to indicate an importance of the nodes of one or more of the layers. In some cases, a deep learning network can have a series of many hidden layers, with early layers being used to determine simple and low-level characteristics of an input, and later layers building up a hierarchy of more complex and abstract characteristics.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For example, higher layers may learn to represent complex shapes in visual data or words in auditory data. Still higher layers may learn to recognize common visual objects or spoken phrases. Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
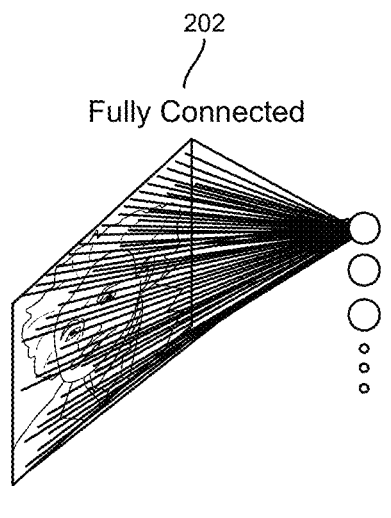
FIG. 2A illustrates an example of a fully connected neural network, in accordance with some examples.
Figure 2B:
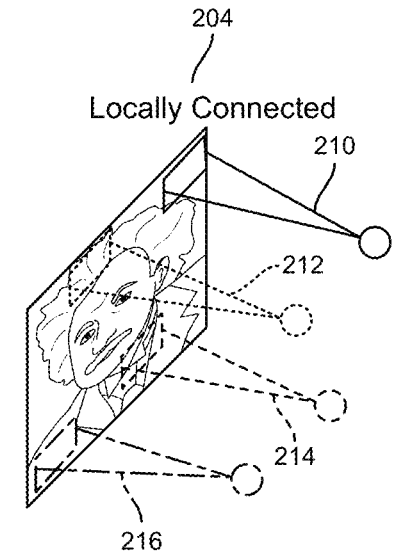
FIG. 2B illustrates an example of a locally connected neural network, in accordance with some examples.

The connections between layers of a neural network may be fully connected or locally connected. FIG. 2A illustrates an example of a fully connected neural network 202. In a fully connected neural network 202, a neuron in a first hidden layer may communicate its output to every neuron in a second hidden layer, so that each neuron in the second layer will receive input from every neuron in the first layer. FIG. 2B illustrates an example of a locally connected neural network 204. In a locally connected neural network 204, a neuron in a first hidden layer may be connected to a limited number of neurons in a second hidden layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
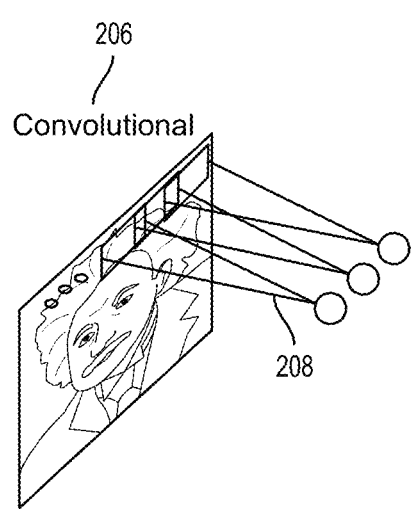
FIG. 2C illustrates an example of a convolutional neural network, in accordance with some examples.

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful. Convolutional neural network 206 may be used to perform one or more aspects of video compression and/or decompression, according to aspects of the present disclosure. An illustrative example of a deep learning network is described in greater depth with respect to the example block diagram of FIG. 13. An illustrative example of a convolutional neural network is described in greater depth with respect to the example block diagram of FIG. 10.

Figure 3:
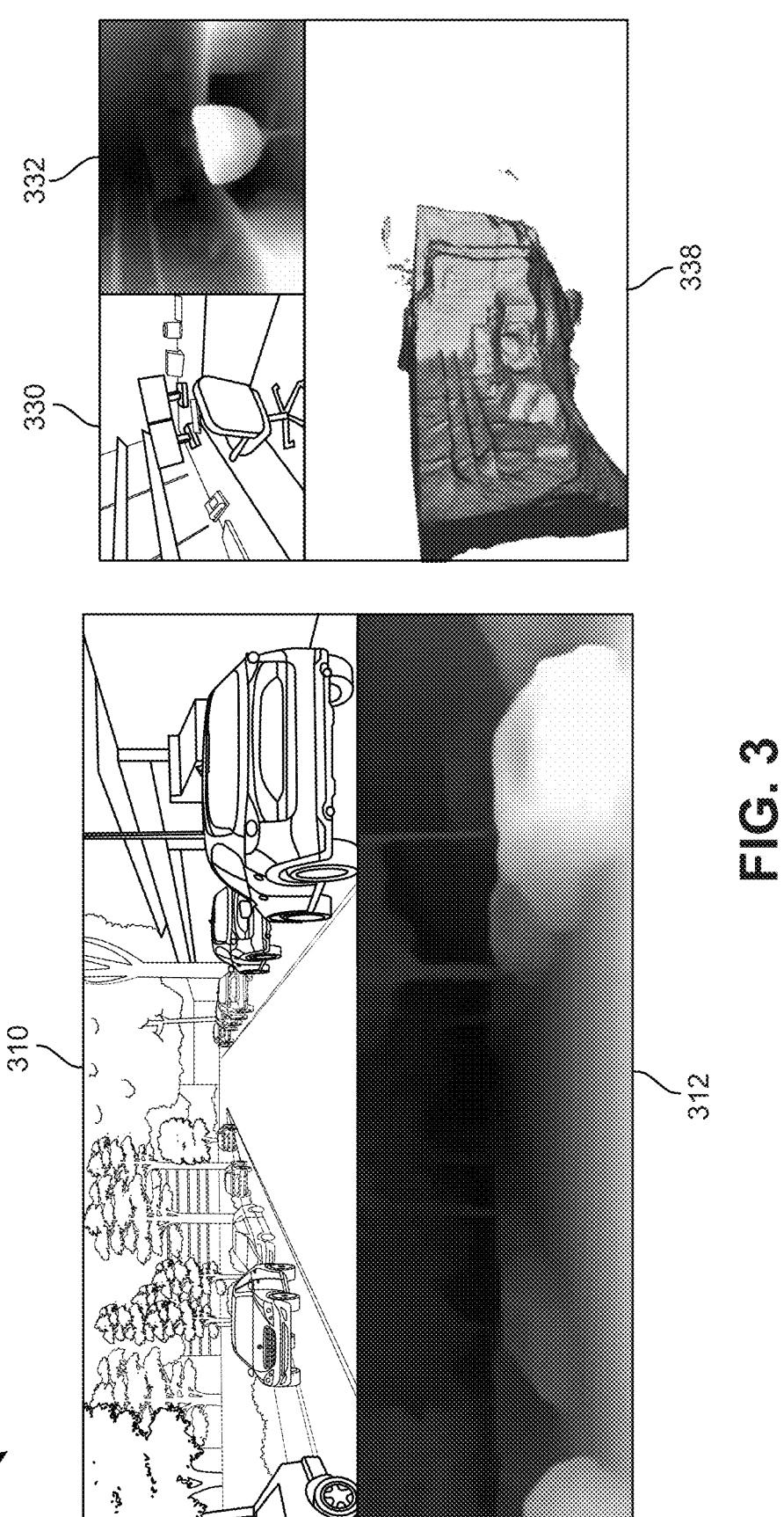
FIG. 3 illustrates examples of monocular depth estimation, in accordance with some examples.

FIG. 3 is a diagram illustrating examples of monocular depth estimation 300, in accordance with some examples. Monocular depth estimation can be used to estimate the distance of each pixel from the camera, given an image captured by a single camera. The estimated distance determined for each pixel of the single camera image can be referred to as the corresponding depth information of the pixel. The depth information for each pixel of the plurality of pixels included in the single camera image can be combined into a depth map or depth estimate for the single camera image.

For example, monocular depth estimation techniques can be used to generate corresponding depth information 312 for a single camera image 310. In another example, monocular depth estimation techniques can be used to generate corresponding depth information 332 for a single camera image 330. In some cases, the monocular-estimated depth map 332 can be used to generate a 3D reconstruction 338 (e.g., a 3D model) corresponding to the imaged scene represented in the single camera image 330.

As noted previously, the systems and techniques described herein can be used to perform depth estimation using one or more images. In one illustrative example, the systems and techniques can be used to perform video depth estimation for a plurality of images (e.g., a plurality of video frames, also referred to as "video data"). In some aspects, the systems and techniques can perform video depth estimation without utilizing a cost-volume structure and/or without utilizing cost-volume-based machine learning models. In some examples, the systems and techniques can additionally perform video depth estimation without utilizing optical flow estimation and/or without utilizing backpropagation to update memory features during inference.

Figure 5:
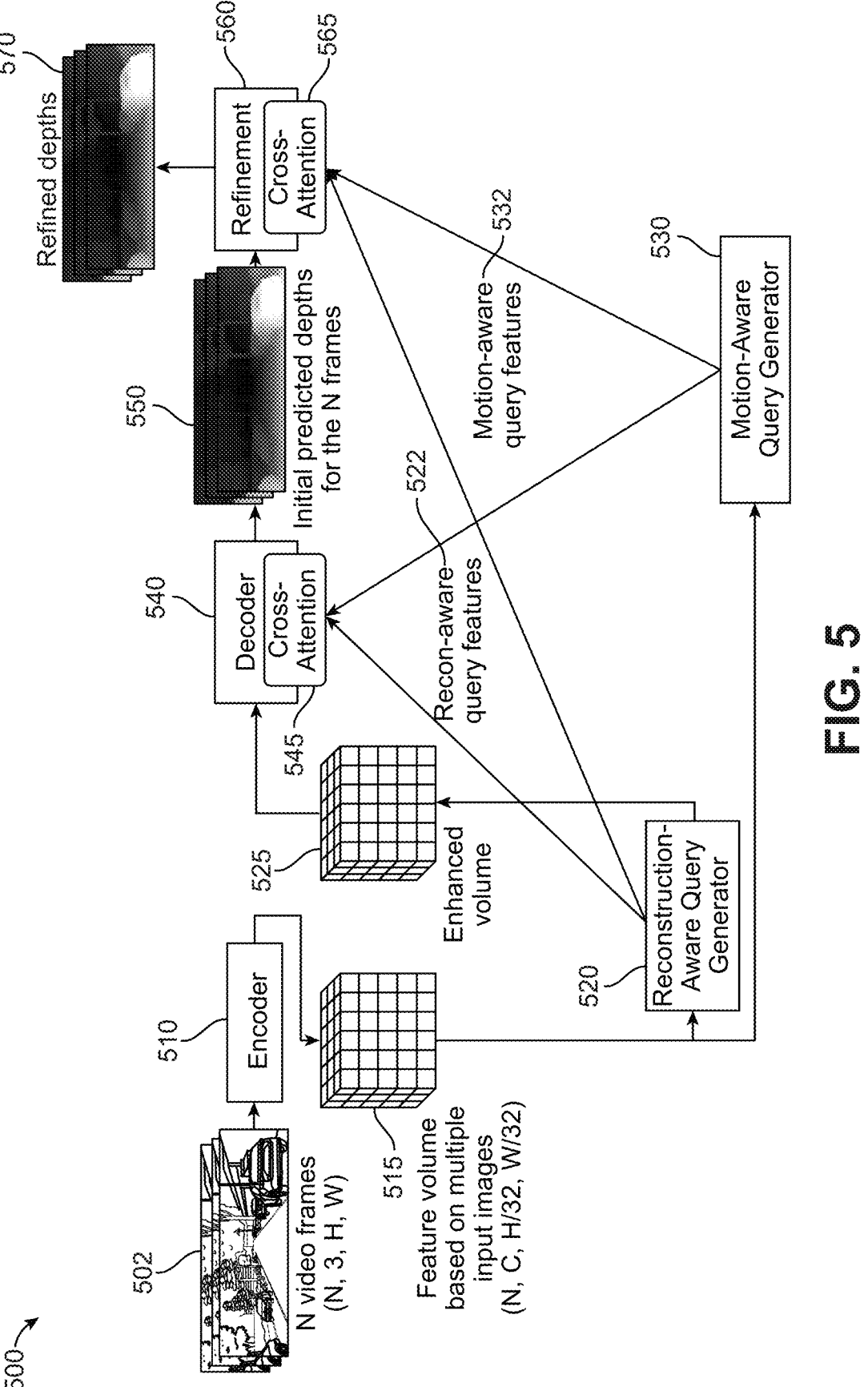
FIG. 5 illustrates another example of a video depth estimation machine learning network based on feature reconstruction with adaptive masking and future prediction, in accordance with some examples.
Figure 6:
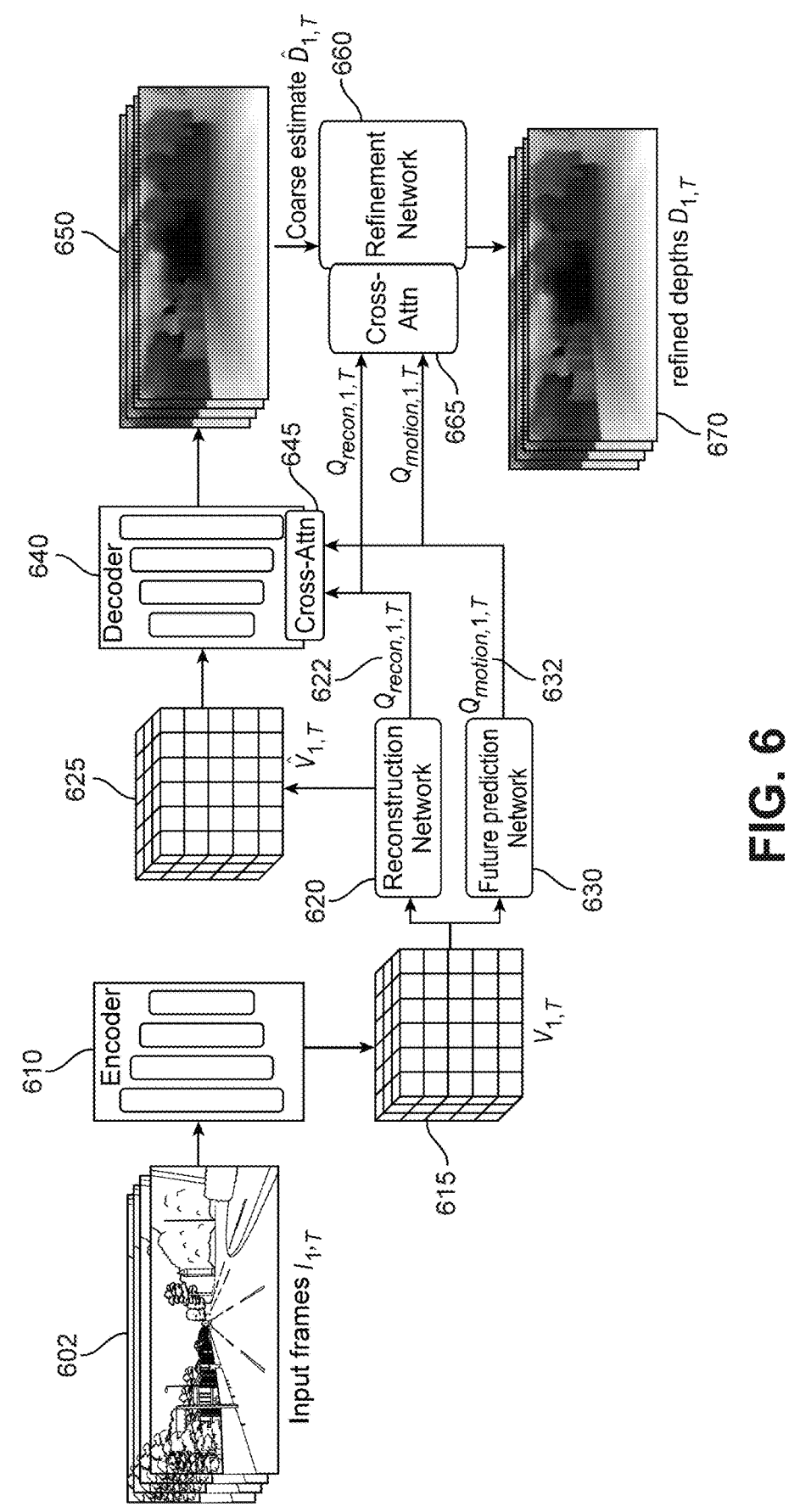
FIG. 6 illustrates another example of a video depth estimation machine learning network based on feature reconstruction with adaptive masking and future prediction, in accordance with some examples.

In some aspects, the systems and techniques can be used to perform video depth estimation based on feature reconstruction with adaptive masking and motion prediction. For example, FIGS. 4-6 are diagrams illustrating respective examples of a video depth estimation machine learning network that can be used to perform video depth estimation based on feature reconstruction with adaptive masking and future prediction, in accordance with some examples.

Figure 4:
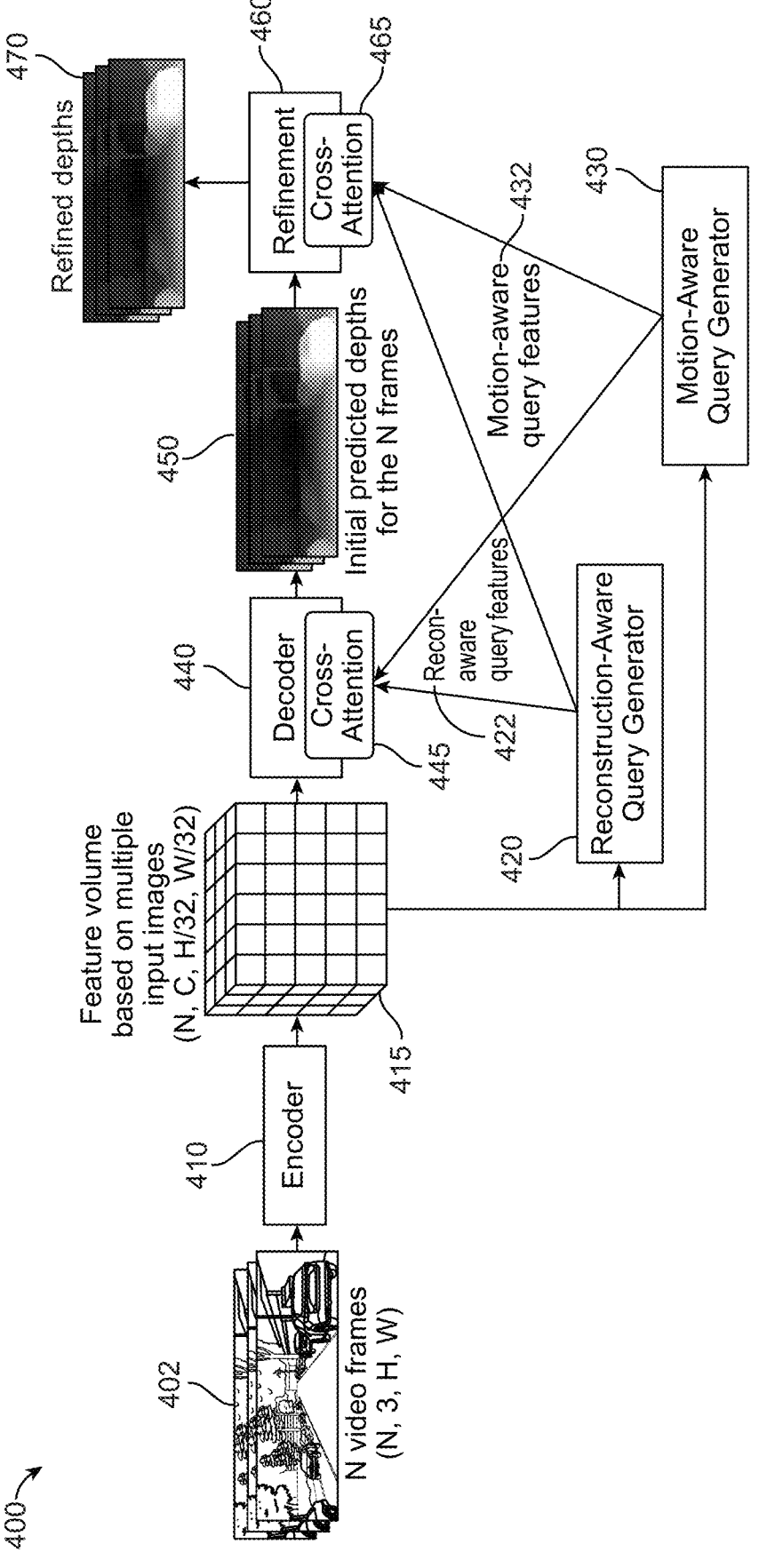
FIG. 4 illustrates an example of a video depth estimation machine learning network based on feature reconstruction with adaptive masking and future prediction, in accordance with some examples.

For example, the video depth estimation machine learning system 400 of FIG. 4 can be used to perform video depth estimation for a video frame batch 402 that includes a sequence of N video frames. The video frame batch 402 can include N respective video frames, where each respective video frame has 3 channels (e.g., RGB or other color channels), a vertical resolution of H pixels, and a horizontal resolution of W pixels. In some examples, the input video frame batch 402 can be referred to and/or can be associated with the dimensions (N, 3, H, W).

In one illustrative example, the N consecutive video frames included in the input 402 can be used to predict N corresponding initial depth map predictions 450 and N corresponding refined depth map predictions 470. For example, each video frame of the input sequence of video frames 402 can be provided to an image encoder 410 to generate corresponding visual features for each of the N consecutive video frames. The stacked features of the N video frames 402 can be used to generate a corresponding feature volume 415, with dimensions (N, C, H/32, W/32), where C represents the number of channel dimensions of the feature volume 415.

The feature volume 415 can be provided to a decoder 440 to generate the N initial depth predictions 450 for each respective video frame of the N input video frames 402. In one illustrative example, the decoder 440 can include one or more cross-attention layers 445 that are configured to cross-attend to the decoder 440 features based on reconstruction-aware query 422 (e.g., generated by a reconstruction network 420) and motion-aware query 432 (e.g., generated by a motion prediction network 430).

The initial depth predictions 450 can be provided to a refinement network 460, which can be used to generate final predicted depth information 470. For example, the refinement network 460 can generate a corresponding N refined depth maps 470 for an input comprising the N initial predicted depth maps 450. In some aspects, the refinement network 460 can include one or more cross-attention layers 465 that are configured to cross-attend to the initial depth information 450 during the refinement process, for example based on or using the reconstruction-aware query information 422 from reconstruction network 420 and the motion-aware query information 432 from the prediction network 430.

In some aspects, the systems and techniques described herein can be used to perform video depth estimation given a sequence of video frames, $I_{1,T}=\{I_1, I_2, \ldots, I_T\}$ as input, with a video depth estimation machine learning system configured to process the sequence of video frames $I_{1,T}$ in a batch to compute corresponding depths $D_{1,T}=\{D_1, D_2, \ldots, D_T\}$ simultaneously.

In one illustrative example, the input sequence of video frames 402 can be the same as or similar to the sequence of video input frames $I_{1,T}=\{I_1, I_2, \ldots, I_T\}$. The sequence of video input frames 402 can be passed through an encoder 410 to generate corresponding visual features for each respective one of the video frames. The features generated by encoder 410 for each respective frame of the sequence of video input frames 402 can be concatenated to generate a feature volume 415. For example, the input video frame 402 dimension of (N, 3, H, W) can correspond to the feature volume 415 dimension of (N, C, H/32, W/32), where C represents the number of channels of the feature volume 415.

In some examples, the video depth estimation machine learning system 400 of FIG. 4 can be configured to pass the input frames $\{I_1, I_2, \ldots, I_T\}$ (e.g., input video frames 402) through an encoder (e.g., encoder 410) and to concatenate the corresponding outputs in the channel dimension to construct a feature volume (e.g., feature volume 415) as $V_{1,T}=\{F_1, F_2, \ldots, F_T\}$. Here, $F_t$ represents the encoder feature output of $I_t$ for t=1, 2, . . . , T.

In some examples, the feature volume 415 can be provided to a reconstruction network 420 (e.g., also referred to as a reconstruction-aware query generator) and a motion prediction network 430 (e.g., also referred to as a motion-aware query generator), where the feature volume 415 is used to generate the queries $Q_{recon,1,T}$ and $Q_{motion,1,T}$, respectively. In some aspects, $Q_{recon,1,T}$ can be the same as or similar to the reconstruction-aware query features 422 generated by the reconstruction network 420 of FIG. 4. In some cases, $Q_{motion,1,T}$ can be the same as or similar to the motion-aware query features 432 generated by the motion prediction network 430 of FIG. 4.

In one illustrative example, the queries $Q_{recon,1,T}$ and $Q_{motion,1,T}$ (e.g., recon-aware query features 422 and motion-aware query features 432) can be used in a decoder 440 and a refinement network 460 to determine high-quality depth information $D_{1,T}$ simultaneously for each respective one of the input frames $\{I_1, I_2, \ldots, I_T\}$. For example, the decoder 440 and refinement network 460 can determine refined depth information 470 for the sequence of input video frames 402, based on performing batch processing video depth estimation over the plurality of video frames included in the input sequence of video frames 402.

In some aspects, given $I_{1,T}$ video frames (e.g., input video frames 402) to compute high quality depth information $D_{1,T}$ (e.g., refined depths 470), the systems and techniques can be trained to learn spatial and temporal relations of different objects present in the video frames. As noted previously, existing cost-volume based methods may be implemented based on using metadata such as camera pose or various other camera parameters to project to a common 3D space and subsequently learn relational object positions in different video frames, which requires computationally and memory expensive operations.

The systems and techniques described herein can utilize representation learning-based techniques to learn a common feature volume $V_{1,T}$ (e.g., feature volume 415) for the video frames $I_{1,T}$ (e.g., video frames 402), that can represent the important spatial and temporal relations of the objects in $I_{1,T}$ (e.g., video frames 402). The systems and techniques described herein can include a reconstruction network (e.g., reconstruction network 420) that can generate adaptive mask information to focus on the important feature regions within the video frames (e.g., video frames 402). In some examples, the reconstruction network (e.g., reconstruction network 420) can be trained in masked auto encoder fashion to learn the improved representations of feature volume $V_{1,T}$ (e.g., feature volume 415).

In some aspects, the reconstruction network (e.g., reconstruction network 420) can be used to generate reconstruction-aware queries (e.g., reconstruction-aware query features 422) that represent a spatial and temporal understanding of the objects within the video frames being batch processed (e.g., video frames 402) and that may be used by the decoder (e.g., decoder 440) while computing high quality depths (e.g., refined depths 470).

In some aspects, motion and/or temporal relationships of the objects learned by the reconstruction network (e.g., reconstruction network 420) may be local information corresponding to the video frame being analyzed and/or can be limited to a subsequent frame. In one illustrative example, a future prediction network (e.g., motion prediction network 430) can be used to learns the motion and/or temporal relationships of the video frame objects across existing video frames and future video frames or beyond. The future prediction network (e.g., motion prediction network 430) can be used to generate motion queries $Q_{motion,1,T}$ (e.g., motion-aware query features 432) for input video frames $I_{1,T}$ (e.g., video frames 402).

In some aspects, spatial and temporal relationship information of different objects can be learned and represented as the query features $Q_{recon,1,T}$ and $Q_{motion,1,T}$ (e.g., the reconstruction network 420 query features 422, and the motion prediction network 430 query features 432, respectively). The query features $Q_{recon,1,T}$ and $Q_{motion,1,T}$ can be cross-attended with encoder features in the decoder (e.g., cross-attended with encoder 410 features in the decoder 440) to compute coarse estimated depths $\hat{D}_{1,T}$ (e.g., initial depth predictions 450). The same queries (e.g., query features 422 and 432) can be used in the refinement network (e.g., refinement network 460) to perform finer improvements to the coarse depths $\hat{D}_{1,T}$ (e.g., initial predicted depths 450) and produce high quality depth $D_{1,T}$ (e.g., refined depths 470).

In some aspects, the decoder 440 can be configured to directly utilize the encoder-generated feature volume 415 (e.g., generated by encoder 410). In another example, the decoder 440 can be configured to utilize an enhanced feature volume generated by the reconstruction-aware query generator 420 based on the encoder-generated feature volume 415. For example, the decoder 540 of FIG. 5 (which can be the same as the decoder 440 of FIG. 4) may be configured to utilize an enhanced feature volume 525 generated by the reconstruction-aware query generator 520 (which can be the same as or similar to the reconstruction-aware query generator 420 of FIG. 4).

FIG. 5 is a diagram illustrating another example of a video depth estimation machine learning system 500 based on feature reconstruction with adaptive masking and future prediction, in accordance with some examples. The video depth estimation machine learning system 500 of FIG. 5 can be the same as or similar to the video depth estimation machine learning system 400 of FIG. 4. For example, the input video frame sequence 502 of FIG. 5 can be the same as or similar to the input video frame sequence 402 of FIG. 4; the encoder 510 can be the same as or similar to the encoder 410 of FIG. 4; the initial feature volume 515 of FIG. 5 can be the same as or similar to the feature volume 415 of FIG. 4; etc. In some aspects, the reconstruction-aware query generator (e.g., reconstruction network) 520 of FIG. 5 can be the same as or similar to the reconstruction-aware query generator (e.g., reconstruction network) 420 of FIG. 4. In some aspects, the motion-aware query generator (e.g., motion prediction network) 530 of FIG. 5 can be the same as or similar to the motion-aware query generator (e.g., motion prediction network) 430 of FIG. 4. The decoder 540 and cross-attention layers 545 of FIG. 5 can be the same as or similar to the decoder 440 and cross-attention layers 445 of FIG. 4, respectively. The reconstruction-aware query features 522 of FIG. 5 can be the same as or similar to the reconstruction-aware query features 422 of FIG. 4. The motion-aware query features 532 of FIG. 5 can be the same as or similar to the motion-aware query features 432 of FIG. 4. The initial predicted depth information 550 of FIG. 5 can be the same as or similar to the initial predicted depth information 450 of FIG. 4. The refinement network 560 and cross-attention layers 565 of FIG. 5 can be the same as or similar to the refinement network 460 and cross-attention layers 465, respectively, of FIG. 4. The refined depth information 570 of FIG. 5 can be the same as or similar to the refined depth information 470 of FIG. 4.

FIG. 6 illustrates another example of a video depth estimation machine learning network 600 based on feature reconstruction with adaptive masking and future prediction, in accordance with some examples. In some aspects, the video depth estimation machine learning network 500 can be the same as or similar to the video depth estimation machine learning network 500 of FIG. 5 and/or the video depth estimation machine learning network 400 of FIG. 4. For example, the input video frames 602 can be the same as or similar to the input video frames 402 of FIGS. 4 and/or 502 of FIG. 5; the encoder 610 can be the same as or similar to the encoder 410 of FIGS. 4 and/or 510 of FIG. 5; the initial feature volume 615 can be the same as or similar to the feature volume 415 of FIG. 4 and/or the initial feature volume 515 of FIG. 5; etc.

In some aspects, the reconstruction network 620 can be the same as or similar to the reconstruction-aware query 420 of FIGS. 4 and/or 520 of FIG. 5. In some aspects, the future prediction network 630 can be the same as or similar to the motion-aware query generator (e.g., motion prediction network) 430 of FIGS. 4 and/or 530 of FIG. 5. The decoder 640 and cross-attention layers 645 can be the same as or similar to the decoder 440 and cross-attention layers 445 of FIG. 4 (respectively) and/or the decoder 540 and cross-attention layers 545 of FIG. 5 (respectively).

A set of input frames 602 can correspond to a set of input frames $I_{1,T}=\{I_1, \ldots, I_T\}$ (e.g., a set of input frames including input frame 1, input frame 2, . . . , input frame T−1, input frame T). A set of refined depths 670 can correspond to a set of refined depths $D_{1,T}=\{D_1, \ldots, D_T\}$. A query $Q_{recon,1,T}$ can be a reconstruction-aware query for $I_{1,T}$. A query $Q_{motion,1,T}$ can be a motion-aware query for $I_{1,T}$. The volume $V_{1,T}$ can be a feature volume for $I_{1,T}$.

The query $Q_{recon,1,T}$ 622 can be the same as or similar to the reconstruction-aware query features 522 of FIG. 5 and/or the reconstruction-aware query features 422 of FIG. 4. The query $Q_{motion,1,T}$ 632 can be the same as or similar to the motion-aware query features 532 of FIG. 5 and/or the motion-aware query features 432 of FIG. 4. The coarse depth estimate 650 can be the same as or similar to the initial predicted depth information 550 of FIG. 5 and/or the initial predicted depth information 450 of FIG. 4. The refinement network 660 can be the same as or similar to the refinement network 560 of FIGS. 5 and/or 460 of FIG. 4. The cross-attention layers 665 can be the same as or similar to the cross-attention layers 565 of FIGS. 5 and/or 465 of FIG. 4. The refined depths $D_{1,T}$ 670 can be the same as or similar to the refined depth information 570 of FIGS. 5 and/or 470 of FIG. 4.

In some aspects, processing video frames $I_{1,T}$ 602 simultaneously in a batch-wise manner can be used for the network 600 to learn the spatial and temporal relation of the objects represented within the video frames 602. The learned spatial and temporal relationships and/or information can be used by the network 600 to compute high-quality and temporally-consistent refined depths $D_{1,T}$ 670. Masked encoder techniques can be used to learn spatial and temporal relationships of the initial features volume $V_{1,T}$ 615 (e.g., which can be the latent encoder 610 output features of $I_{1,T}$ 602). In one illustrative example, the systems and techniques can be used to implement a reconstruction network 620 in latent space with adaptive masking techniques trained in auto encoder fashion. The reconstruction network 620 can be used generated to queries $Q_{recon,1,T}$ 622 that include and/or represent the spatial and temporal representations that can be used by the decoder 640 and/or the refinement network 660, in the respective cross-attention layers 645 and 665.

Figure 7A:
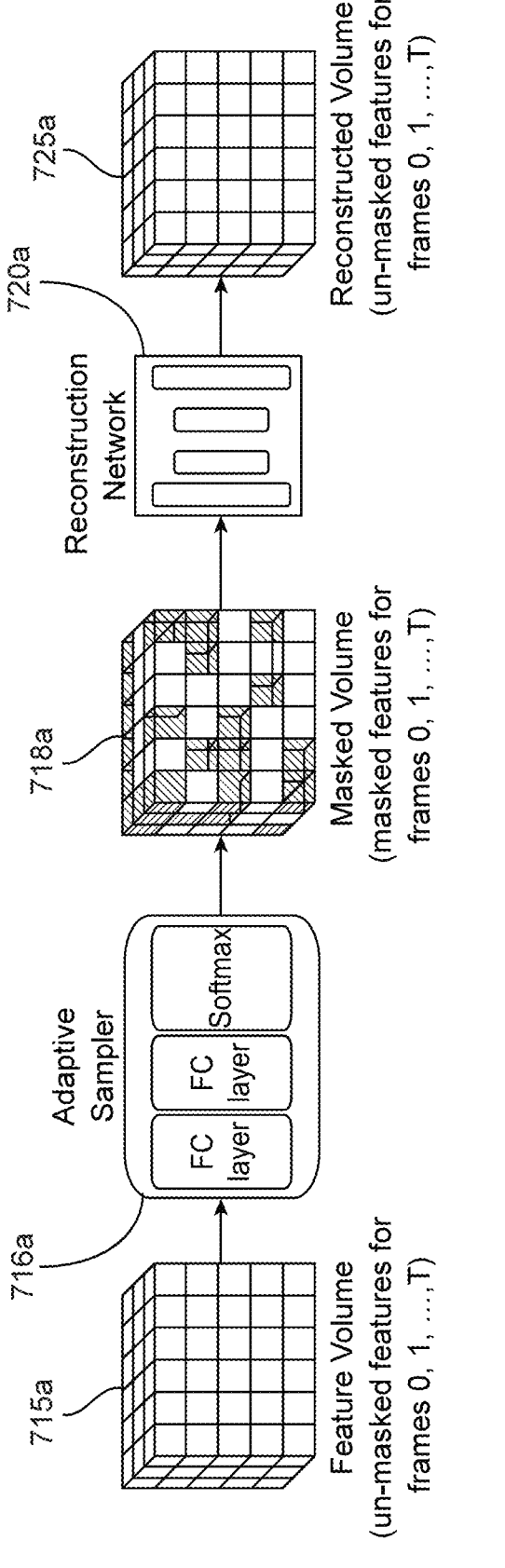
FIG. 7A illustrates an example of a feature reconstruction machine learning network, in accordance with some examples.
Figure 7B:
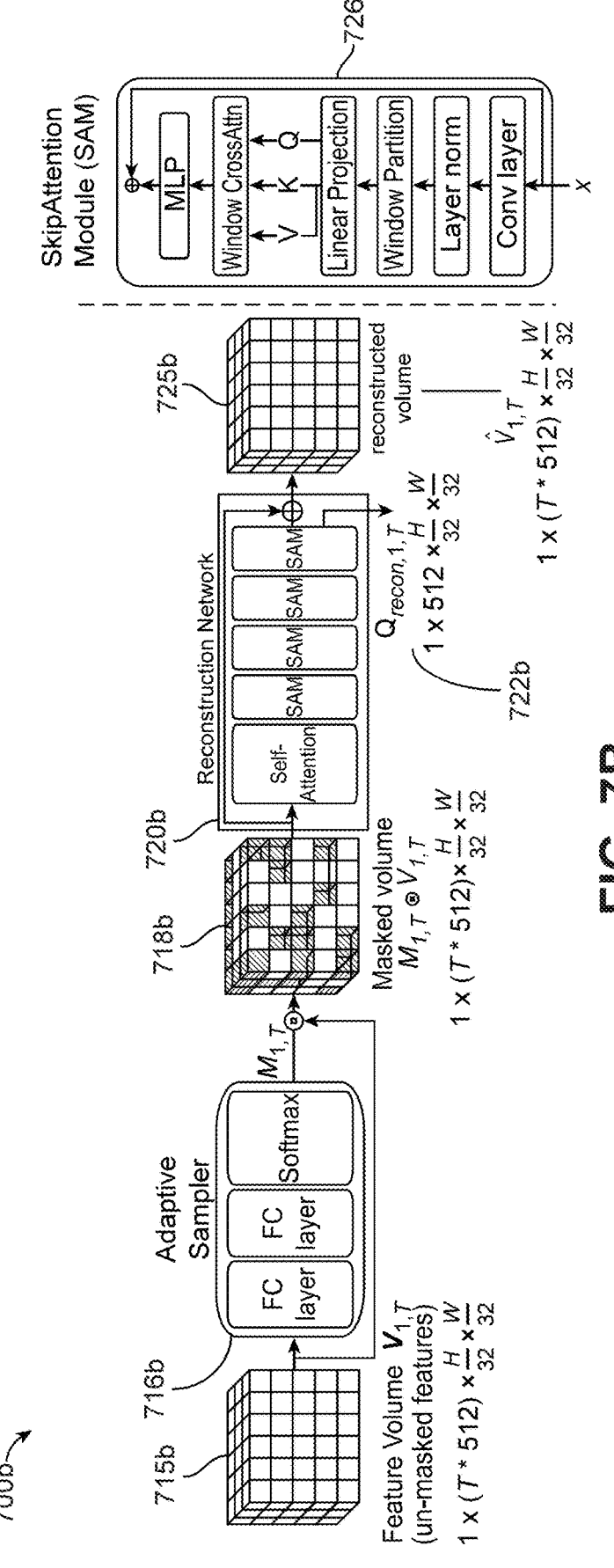
FIG. 7B illustrates another example of a feature reconstruction machine learning network, in accordance with some examples.

FIG. 7A illustrates an example of a feature reconstruction machine learning network 700a and FIG. 7B illustrates another example of a feature reconstruction machine learning network 700b. In some aspects, the feature reconstruction machine learning network 700a can be the same as or similar to the feature reconstruction machine learning network 700b. In some cases, the feature reconstruction machine learning network 700a and/or the feature reconstruction machine learning network 700b can be the same as or similar to the reconstruction-aware query generator 420 of FIG. 4; the reconstruction-aware query generator 520 of FIG. 5; and/or the reconstruction network 620 of FIG. 6.

For example, an initial feature volume 715a of FIG. 7A can be the same as the initial feature volume $V_{1,T}$ 715b of FIG. 7B, which can be the same as or similar to the feature volume 415 of FIG. 4, 515 of FIGS. 5, and/or 615 of FIG. 6. The reconstructed feature volume 725a of FIG. 7A can be the same as or similar to the reconstructed feature volume $\hat{V}_{1,T}$ 725b of FIG. 7B, which can be the same as or similar to the enhanced feature volume 525 of FIGS. 5 and/or 625 of FIG. 6. An intermediate, masked feature volume 718a of FIG. 7A can be the same as or similar to the masked feature volume 718b of FIG. 7B.

The reconstruction network 700a of FIG. 7A and/or 700b of FIG. 7A can implement a reconstruction-aware query generator (e.g., 420 of FIG. 4, 520 of FIG. 5, 620 of FIG. 6, etc.). The reconstruction network 700a/700b can be provided as a neural network that can generate query features that capture key scene features represented in the sequence of input video frames used to generate the initial features volume 715a/715b (e.g., the input video frames 402 of FIG. 4, 502 of FIG. 5, 602 of FIG. 6, etc.). As noted previously, the query features can be used to cross-attend features in the decoder and refinement networks of the video depth estimation machine learning systems described herein (e.g., video depth estimation machine learning system 400 of FIG. 4, 500 of FIG. 5, 600 of FIG. 6, etc.).

During training, a feature volume reconstruction network can receive as input a masked feature volume (e.g., 718a of FIG. 7A, 718b of FIG. 7B) that is used to train the feature volume reconstruction network to reconstruct the complete version of the masked feature volume. The masking sampler can be trained together with the feature volume reconstruction network, such that the feature volume reconstruction network together with the sampler network learn to focus on the information that is important for reconstructing the visual features.

For example, during training, feature volume reconstruction network 720a of FIG. 7A (e.g., which can use a U-Net architecture) can receive as input the masked feature volume 718a, which is generated using the sampler 716a of FIG. 7A. The sampler network 716a can include a first and second fully connected (FC) layer, and a softmax layer. The sampler network 716a can be trained together with the U-net network 720a, such that the feature volume reconstruction U-net 720a together with the sampler network 716a learn to focus on the information that is important for reconstructed the masked visual features of the masked feature volume 718a. In some aspects, the masking sampler network 716a can be a small network that learns to determine where to mask within the initial feature volume 715a to generate the masked feature volume 718a. In some examples, random masking may be implemented to generate the masked volume 718a from the initial feature volume 715a. In some aspects, the feature volume reconstruction network 720a can be implemented using a U-net architecture, a CNN architecture, a transformer-based network, etc., and can be trained to reconstruct the initial feature volume 715a by generating the reconstructed feature volume 725a given the masked feature volume 718a (e.g., the reconstructed feature volume 725a can be the same as or similar to the initial feature volume 715a, which is unseen by the feature volume reconstruction network 720a).

In some cases, the sampler network 716a of FIG. 7A can be the same as or similar to the sampler network 716b of FIG. 7B. For example, while training the reconstruction network 700a and/or 700b in masked auto-encoder fashion, masking techniques can be utilized for the representation learning of feature volume $V_{1,T}$ (e.g., 715a of FIG. 7A, 715b of FIG. 7B). Naively masking features in $V_{1,T}$ may result in losing useful information and may not be beneficial in learning a better representation of $V_{1,T}$ for high quality depth estimation. In some examples, adaptive sampling can be implemented for a learnable mask generator that preserves the most important features in the input feature volume $V_{1,T}$ (e.g., 715a, 715b).

In one illustrative example, the adaptive sampler 716a of FIG. 7A and/or 716b of FIG. 7B can include a first fully connected layer (FC layer), a second FC layers, and a softmax layer. The adaptive sampler 716a and/or 716b can be configured as a learnable mask generator for the reconstruction network 700a, 700b (respectively), where the learnable mask generator is configured to generate a mask that preserves important features within $V_{1,T}$.

For example, the adaptive sampler network 716b of FIG. 7B can be used to generate as output the masks $M_{1,T}=\{M_1, M_2, \ldots, M_T\}$ corresponding to the initial feature volume $V_{1,T}$ (715a or 715b). For example, the masks Mir can represent a mask for $I_{1,T}$. The masks $M_{1,T}$ generated by the adaptive sampler network 716b can be combined with (e.g., applied to) the initial feature volume $V_{1,T}$ to generate the masked feature volume 718b. For example, the masked feature volume 718b can be represented as $M_{1,T}\odot V_{1,T}$, where $\odot$ represents element-wise multiplication.

The initial feature volume $V_{1,T}$ 715b and the masked feature volume $M_{1,T}\odot V_{1,T}$ 718b can have the same dimensions of $$1\times(T*512)\times\frac{H}{32}\times\frac{W}{32}.$$

Figure 8:
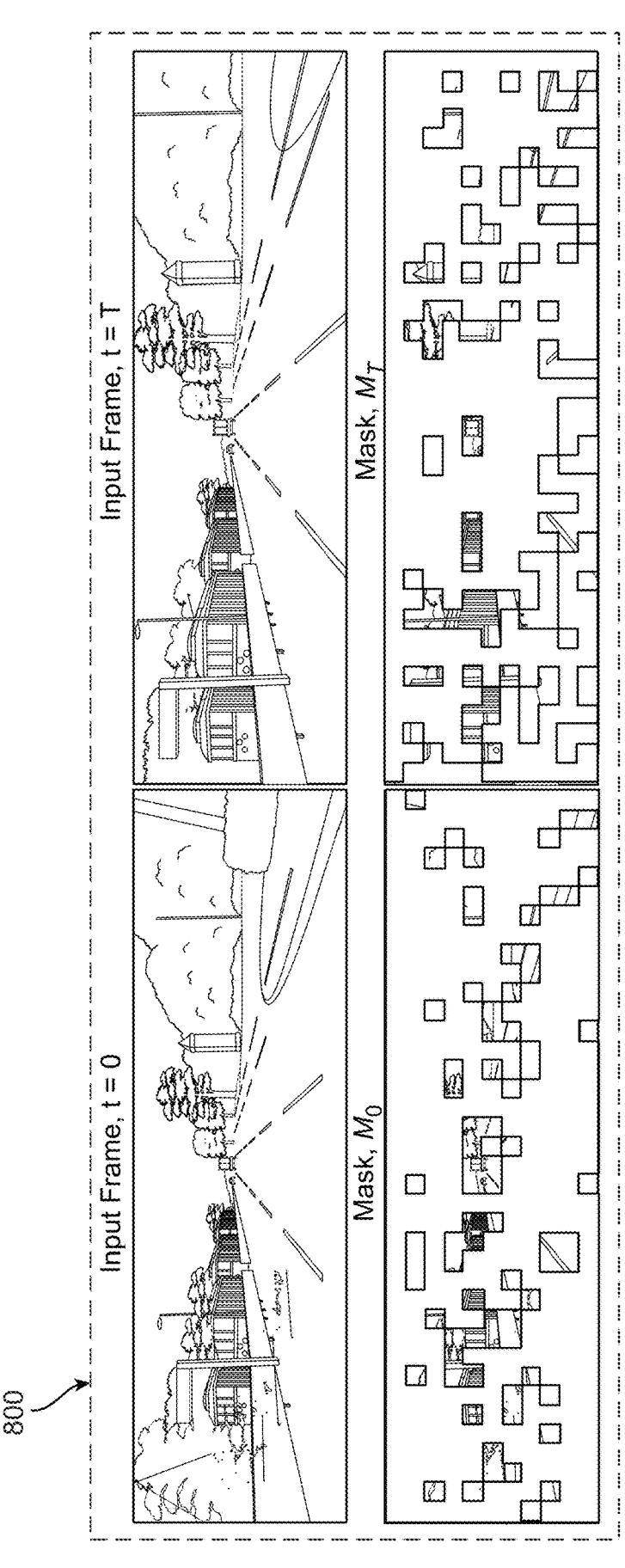
FIG. 8 illustrates example masks associated with one or more of the feature reconstruction machine learning networks of FIG. 7A and/or FIG. 7B, in accordance with some examples.
Figure 8:
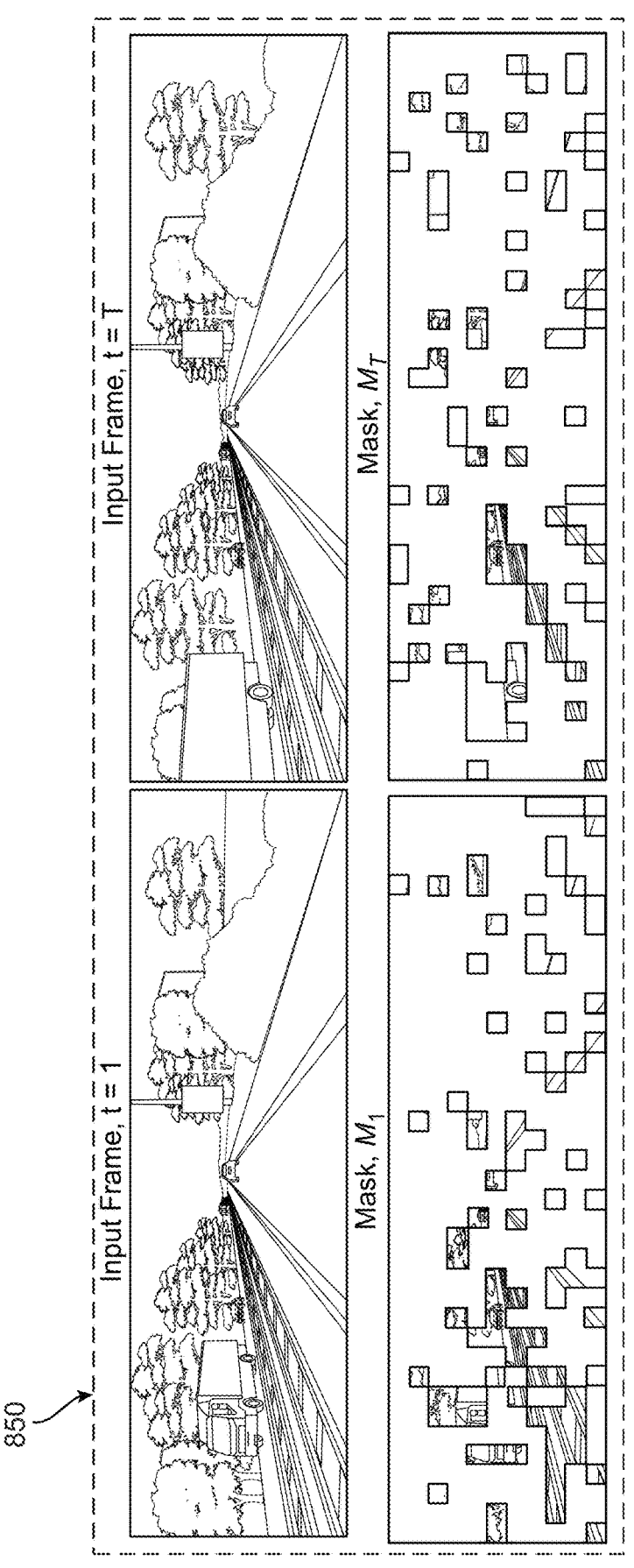

FIG. 8 is a diagram illustrating a first set 800 of input frames and corresponding masks and a second set 850 of input frames and corresponding masks that may be generated using the masking sampler network 716a of FIG. 7A and/or the masking sampler network 716b of FIG. 7B.

For example, the adaptive sampler network 716a/716b can generate the masks $M_0$, $M_1$, and/or $M_T$ (e.g., shown in FIG. 8) to focus on and not mask out important objects such as a truck, car, train, railway tracks, road edges, and/or boards, etc. within the respective input frames. The generated masks $M_0$, $M_1$, and/or $M_T$ (e.g., shown in FIG. 8) can be generated by the adaptive sampler network 716a/716b to ignore unimportant objects such as far-away trees, bushes, walls, etc.

As noted previously, the adaptive sampler network 716a/716b can include two fully-connected (FC) layers and a softmax layer that outputs probability scores for every patch in video frames. Using the probability scores, the patches with the top r×P values (e.g., the patches with high probability scores) can be selected, and the remaining patches may be masked out (e.g., here, r represents the mask ratio and P represents the total number of patches). Without ground-truth information for the masking, the systems and techniques can train adaptive sample weights using SILog loss between depth prediction and ground-truth depth while freezing all other weights (e.g., including reconstruction, future prediction and refinement network weights).

The reconstruction network 720b of FIG. 7B (e.g., which may be the same as or similar to the reconstruction network 720a of FIG. 7A) can be implemented as a transformer-based network, and/or can be implemented using a U-net architecture, among various other machine learning networks, models, architectures, etc. In one illustrative example, the reconstruction network 720b can be implemented as a transformer-based network with a self-attention layer and four skip-attention module (SAM) layers, as shown in FIG. 7B for the reconstruction network 720b. An example architecture of implementing each of the SAM layers within reconstruction network 720b is shown as the Skip Attention Module (SAM) 726 of FIG. 7B.

In some examples, using the masks $M_{1,T}$ generated by the adaptive sampler network 716b, element-wise multiplication is performed with corresponding features in $V_{1,T}$ 715b to obtain the masked feature volume $M_{1,T} \odot V_{1,T}$ 718b. The masked feature volume 718b can be provided as input to the reconstruction network 720b to generate the output reconstructed feature volume $\hat{V}_{1,T}$ 725b.

Subsequently, the reconstructed feature volume $\hat{V}_{1,T}$ 725b and the generated reconstruction queries $Q_{1,T}$ 722b (e.g., which are attention maps in the last layer of the reconstruction network 720b) though the decoder and refinement network to obtain the depths $D_{1,T}$. For example, the reconstructed feature volume $\hat{V}_{1,T}$ 725b of FIG. 7B can be the same as the enhanced feature volume $\hat{V}_{1,T}$ 625 of FIG. 6, and the generated reconstruction queries $Q_{1,T}$ 722b (e.g., which are attention maps in the last layer of the reconstruction network 720b) can be the same as the reconstruction queries $Q_{recon,1,T}$ 622 of FIG. 6 (e.g., generate as attention maps in the last layer of the reconstruction network 620 of FIG. 6).

In some aspects, the reconstruction weights associated with the reconstruction network 420 of FIG. 4, 520 of FIG. 5, 620 of FIG. 6, 720a of FIG. 7A, and/or 720b of FIG. 7B can be trained using the following loss:

$$\mathcal{L}_{recon} = \left\| (1 - M_{1,T}) \odot \left( \hat{V}_{1,T} - V_{1,T} \right) \right\|^2 + \mathcal{L}_{sl}(\hat{D}_{1,T}, D_{1,T}^{gt}) \quad \text{Eq. (1)}$$

In Eq. (1), above, the L2-loss can be determined between reconstructed feature $\hat{V}_{1,T}$ and the original feature volume for masked regions, in addition to the SILog loss ($\mathcal{L}_{sl}$) between predicted depths $D_{1,T}$ and ground-truth depth $$D_{1,T}^{gt}.$$

Using the reconstruction loss of Eq. (1), the adaptive sampler 716a/716b and the reconstruction network 720a/720b can learn better masking techniques that focuses on important objects within the input video frame(s) (e.g., as shown in FIG. 8). Additionally, the reconstruction network 720/720b can learn spatial and temporal relationships of the objects within the input video frame(s) that contribute or are otherwise beneficial for determining the high quality depths information $D_{1,T}$ (e.g., refined depths 670 of FIG. 6).

The future prediction network 630 of FIG. 6 can be implemented as a motion-aware query generator the same as or similar to the motion-aware query generator 430 of FIG. 4 and/or the motion-aware query generator 530 of FIG. 5. For example, the future prediction network 630 (also referred to as a motion prediction network 630) can be implemented as a neural network that can generate query features 632 that capture key motion features of the input frames 602. The motion queries 632 can be used to cross-attend features in the decoder 640 (e.g., using cross-attention layers 645) and in the refinement network 660 (e.g., using cross-attention layers 665).

During training, the future prediction network (e.g., motion-aware query generator) 630 can take as input an initial feature volume corresponding to a current video frame, and is trained to predict the feature volume corresponding to future frames. Based on this training, the future prediction network 630 learns to capture the motion information in the scene associated with input frames 602. In some aspects, no masking is used by the future prediction network 630 during training or inference, as the focus is on future prediction and capturing motion information.

Figures 9A, 9B:
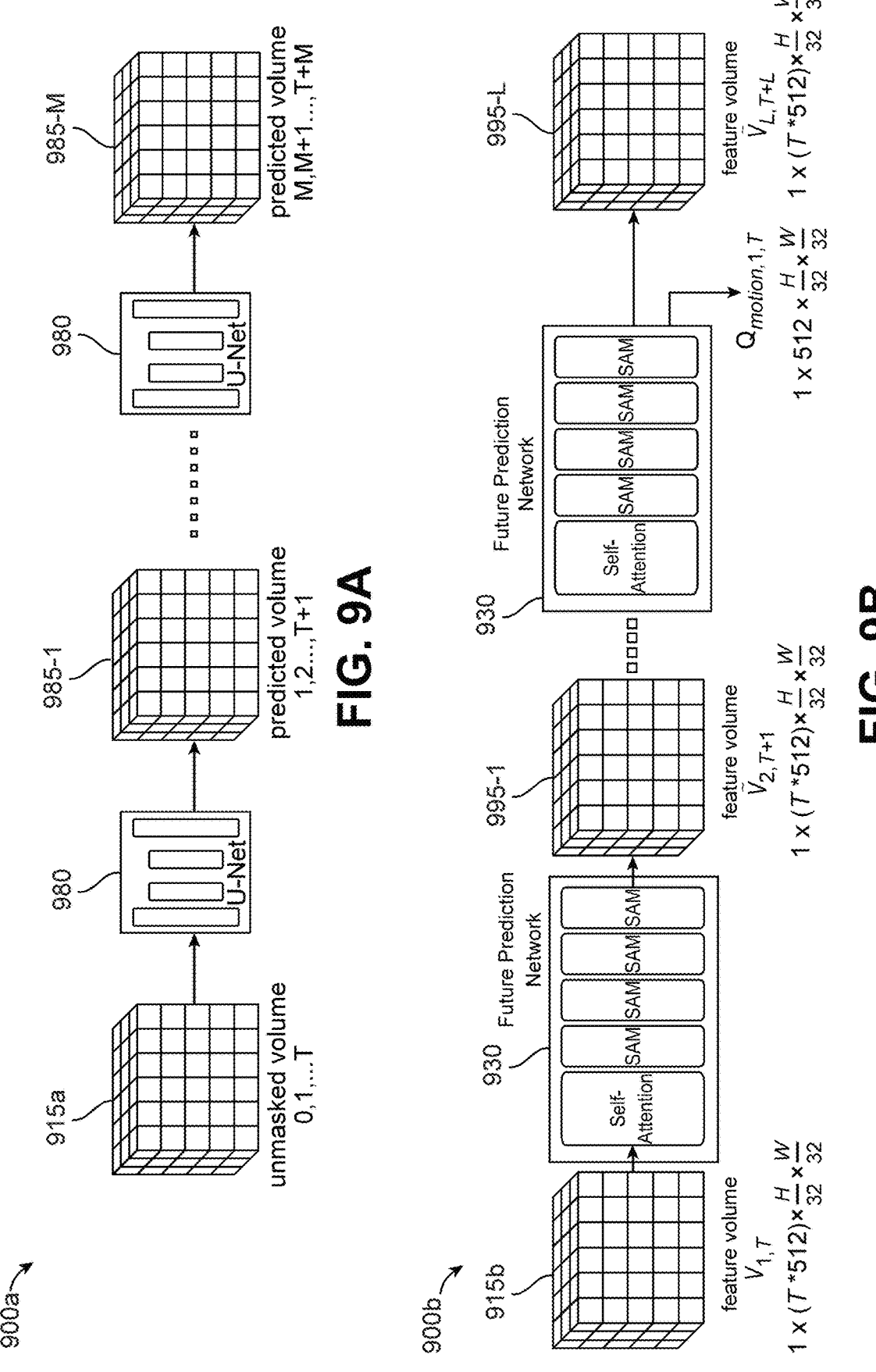
FIG. 9A illustrates an example of a feature prediction machine learning network, in accordance with some examples.
FIG. 9B illustrates an example of a future prediction machine learning network, in accordance with some examples.

For example, FIG. 9A is a diagram illustrating an example of a future prediction-aware query generator machine learning network 900a, that can be used to implement the motion-aware query generator 430 of FIG. 4, the motion-aware query generator 530 of FIG. 5, and/or the future prediction network 630 of FIG. 6. An unmasked feature volume 915a can correspond to concatenated features corresponding to the frames 0, 1, . . . , T included within an input sequence, set, batch, etc., of video frames (e.g., video frames 402, 502, 602, etc.).

The network can be implemented using a U-net architecture 980, which learns to predict the feature volume of a future batch of frames, with a time window shifted by 1 for each input-output sample. For example, the input unmasked volume 915a from times 0, 1, . . . , T corresponds to the predicted feature volume 985-1 generated by the network 980 as a predicted output for the future batch of frames from times 1, 2, . . . , T+1. In another example, the predicted feature volume 985-M is generated by the network 980 as a predicted output for the future batch of frames from times M, M+1, . . . , T+M.

FIG. 9B is a diagram illustrating another example of a future prediction machine learning network 900b, in accordance with some examples. The future prediction machine learning network 900b can be the same as or similar to the future prediction machine learning network 900a of FIG. 9A, and may be used to implement the motion-aware query generator 430 of FIG. 4, the motion-aware query generator 530 of FIG. 5, and/or the future prediction network 630 of FIG. 6. $Q_{motion,1,T}$ can represent a motion-aware query for $I_{1,T}$. $\hat{V}_{L,T+L}$ can represent a feature volume prediction at step 1 (e.g., iteration 1).

The initial feature volume 915b can be the same as or similar to the unmasked volume 915a of FIG. 9A, and can be the same as the feature volume 715b of FIG. 7B. The future prediction network 930 can be the same as or similar to the U-net network 980 of FIG. 9A, the future prediction network 630 of FIG. 6, etc. The predicted feature volume 995-1 of FIG. 9B can be the same as or similar to the predicted feature volume 985-1 of FIG. 9A; the predicted feature volume 995-L of FIG. 9B can be the same as or similar to the predicted feature volume 985-M of FIG. 9A; etc.

In some aspects, while processing feature volume $V_{1,T}$ 915b to compute the high quality depths described herein, the future prediction network 930 can be used to learn the motion of the objects within the input sequence of video frames in order to better understand the behavior or position or motion of the objects (e.g., especially when computing the depths of the input video frames simultaneously in a batch). The future prediction network 930 can be trained and used to predict the future position of the features or objects in the feature volume $V_{1,T}$ 915b. For example, the future prediction network 930 can be used to predict feature volumes at future time frames (>T) given the initial feature volume $V_{1,T}$ 915b at time T.

In one illustrative example, the future prediction network 930 can include a self-attention layer and four skip-attention module (SAM) layers, as shown in the example of FIG. 9B. In some aspects, the SAM layers within future prediction network 930 of FIG. 9B can be the same as or similar to the SAM layer architecture 726 of FIG. 7B.

In some aspects, the future prediction network 930 can be configured to predict the corresponding feature volumes for future time frames (>T) in an iterative process. For example, given the time T feature volume $V_{1,T}$ 915b as input to the future prediction network 930, the future prediction network 930 can first predict the time T+1 feature volume $\hat{V}_{2,T+1}$ 995-1.

At time T+1, the feature volume $V_{2,T+1}$ can be passed as input to the future prediction network 930 to predict the time T+2 feature volume $\tilde{V}_{3,T+2}$, etc.

The prediction process of the future prediction network 930 can be continued for L iterative steps, as shown in the example of FIG. 9B, to predict the iterative feature volume predictions $\tilde{V}_{i+1,i+T}$ corresponding to each respective iterative step 1, and concluding with the iterative feature volume prediction of the time T+L feature volume $\tilde{V}_{L,T+L}$ 995-L.

By predicting the future feature volumes 995-1, . . . , 995-L, the future prediction network 930 learns the motion of the features or object features within the video frame input and/or the future volumes corresponding to the video frame input, which can be used to generate motion queries $Q_{motion,1,T}$ 932. For example, the motion queries $Q_{motion,1,T}$ 932 can be generated based on extracting the attention of the last layer of the future prediction network 930 in the last iteration step L. In one illustrative example, the generated motion queries $Q_{motion,1,T}$ 932 of FIG. 9B can be the same as or similar to the motion-aware query features 432 of FIG. 4, 532 of FIG. 5, 632 of FIG. 6, etc.

In some aspects, the future prediction network 930 can be trained with the loss:

$$\mathcal{L}_{fut} = \sum_{i=1}^{L} \left\| \tilde{V}_{1+i,T+i} - V_{1+i,T+i} \right\|^2 \qquad \text{Eq. (2)}$$

In Eq. (2), the feature volume $V_{1+i,T+i}$ term represents the encoder output for video frames $I_{1+i,T+i}$ (e.g., the output of encoder 610 of FIG. 6 for input video frames 602 comprising the video frames from first time 1+i to a subsequent or second time T+i). Based on the future prediction loss of Eq. (2), the future prediction network 930 learns the motion of objects present in the video frames in feature space and learns to generate the queries 932 for these objects.

Figure 10:
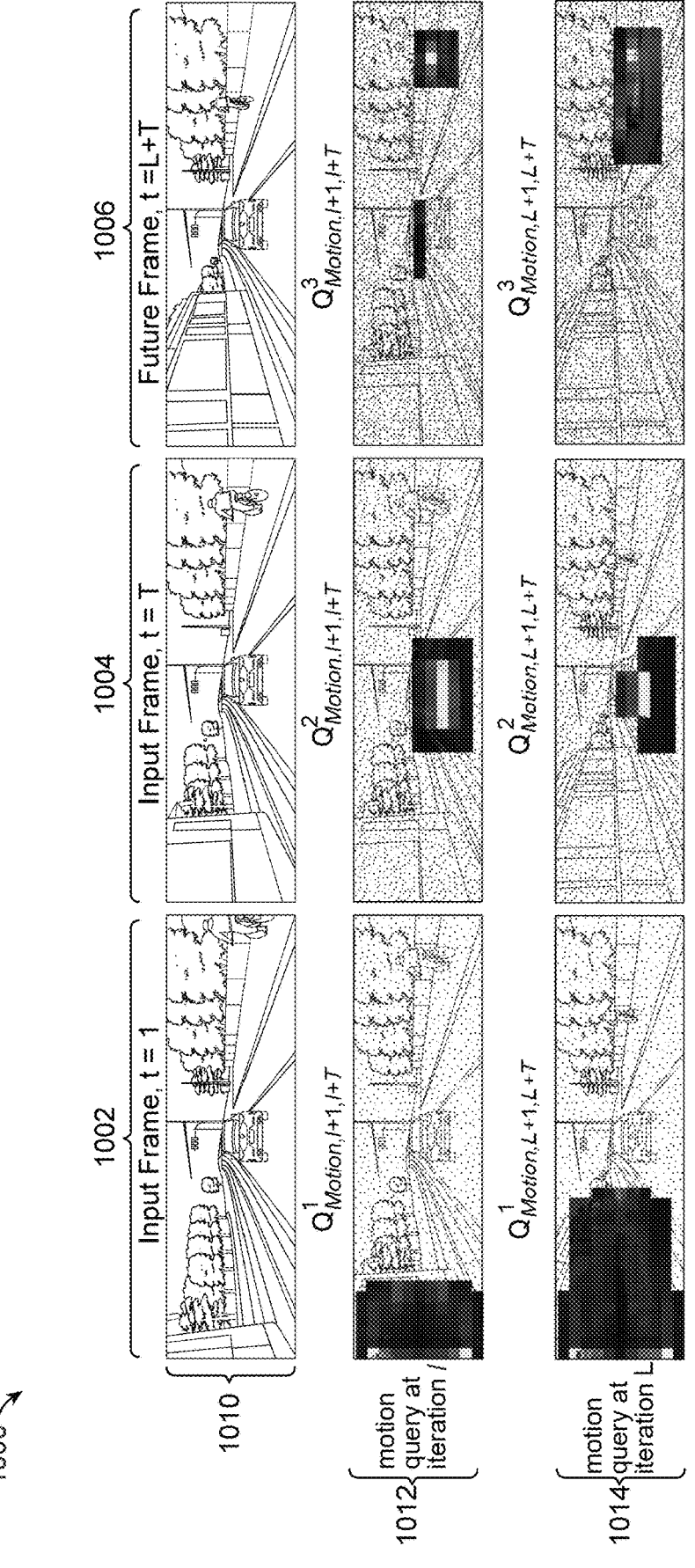
FIG. 10 illustrates an example motion query that may be generated using the prediction machine learning networks of FIG. 9A and/or FIG. 9B, in accordance with some examples.

For example, FIG. 10 illustrates a set of example motion queries 1000 that may be generated using the future prediction network 930 of FIG. 9B, 980 of FIG. 9A, etc. For each input frame time (e.g., the input frame time t=1 column 1002; the input frame time t=T column 1004; the input frame time t=L+T column 1006), a first row 1010 corresponds to the input frame at the time t, a second row 1012 corresponds to the motion query at iteration 1, and a third row 1014 corresponds to the motion query at iteration L.

The example motion queries $Q_{motion,1,T}$ 1000 of FIG. 10 can be generated by the future prediction network 930 of FIG. 9B for objects such as a train, car, person with bicycle, etc., for the given video frames $I_{1,T}$ (e.g., the columns 1002, 1004, 1006 of row 1010). In some aspects, the future prediction network 930 can be configured to take initial feature volume $V_{1,T}$ as input and does not have access to future frames or corresponding feature volumes of future frames (>T). As illustrated in the example motion query 1000 of FIG. 10, the motion query features $Q_{motion,1,T}$ clearly indicate the motion of the objects in the time frames 1 to T and beyond (i.e. >T as well), and can be used to compute high quality (e.g., refined) depth information (e.g., such as the refined depths 670 of FIG. 6) based on using the motion query features in the decoder (e.g., decoder 640 of FIG. 6) and refinement network (e.g., refinement network 660 of FIG. 6) of the video depth estimation machine learning system (e.g., video depth estimation machine learning system 600 of FIG. 6, etc.).

Figure 11:
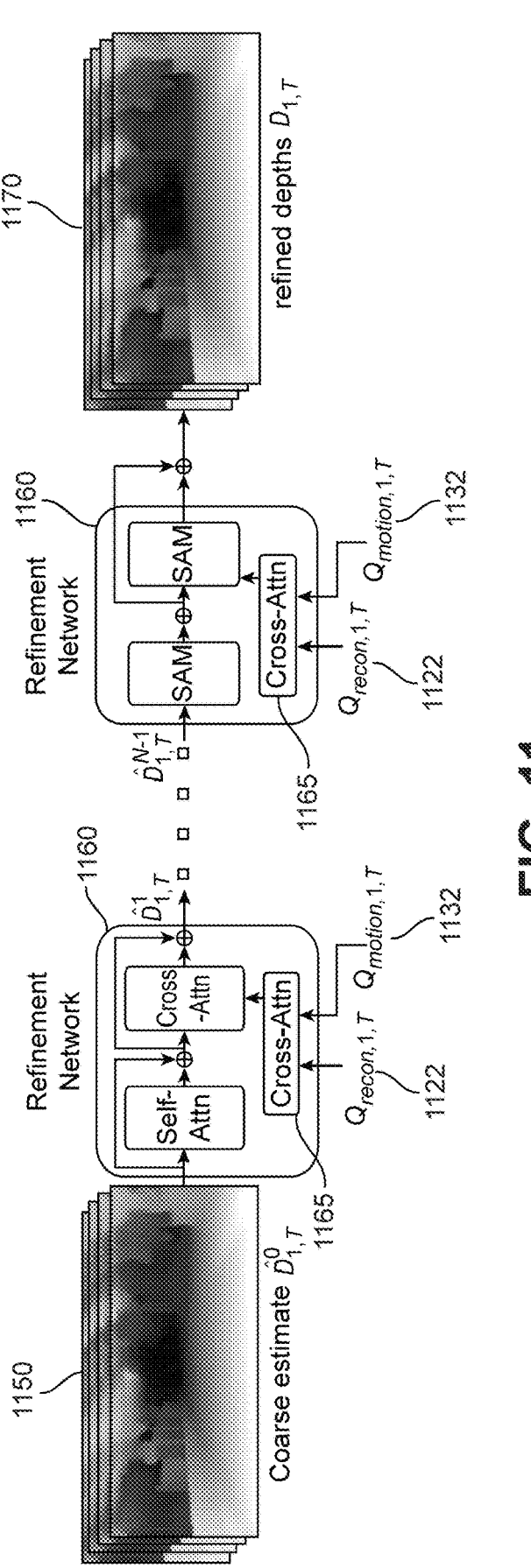
FIG. 11 illustrates an example of a depth refinement machine learning network, in accordance with some examples.

FIG. 11 is a diagram illustrating an example of a refinement network architecture 1100, which may be the same as or similar to the refinement network 660 of FIG. 6, 560 of FIGS. 5, and/or 460 of FIG. 4, etc. In some aspects, the refinement network 1100 can be used to improve (e.g., refine) the quality of initial or coarse computed depth information 1150. The initial or coarse computed depth information 1150 can be the same as or similar to the initial depth estimation 450 from the decoder 440 of FIG. 4, the initial depth estimation 550 from decoder 540 of FIG. 5, and/or the initial depth estimation 650 from decoder 640 of FIG. 6.

In one illustrative example, the refinement network architecture 1100 can include a refinement network 1160 that may be the same as or similar to the refinement network 660 of FIG. 6, 560 of FIGS. 5, and/or 460 of FIG. 4, etc. In some aspects, the refinement network 1160 can be implemented a progressive learning-based refinement network that utilizes as inputs the reconstruction queries $Q_{reconstruction,1,T}$ 1122 and the motion queries $Q_{motion,1,T}$ 1132.

The reconstruction queries $Q_{reconstruction,1,T}$ 1122 of FIG. 11 can be the same as or similar to the reconstruction queries $Q_{recon,1,T}$ 722b of FIG. 7B; the reconstruction queries $Q_{recon,1,T}$ 622 of FIG. 6; the recon-aware query features 522 of FIG. 5; and/or the recon-aware query features 422 of FIG. 4; etc.

The motion queries $Q_{motion,1,T}$ 1132 of FIG. 11 can be the same as or similar to the motion queries $Q_{motion,1,T}$ 932 of FIG. 9B; the motion queries $Q_{motion,1,T}$ 632 of FIG. 6; the motion-aware query features 532 of FIG. 5; and/or the motion-aware query features 432 of FIG. 4; etc.

The refinement network 1160 can include one or more cross-attention layers 1165 that may be the same as or similar to the one or more cross-attention layers 665 of FIG. 6, 565 of FIGS. 5, and/or 465 of FIG. 4, etc.

The refinement network 1160 can use the one or more cross-attention layers 1165 to determine cross-attention between the reconstruction queries $Q_{reconstruction,1,T}$ 1122 and the motion queries $Q_{motion,1,T}$ 1132 to compute $Q_{all}$. In some aspects, the refinement network 1160 further includes a self-attention layer and two cross-attention layers as shown in FIG. 11.

The self-attention layer of refinement network 1160 can be used to first perform or determine self-attention between the initial coarse depth predictions $$\hat{D}_{1,T}\left(= \hat{D}_{1,T}^{0}\right)$$

1150, which are then further cross-attended with $Q_{all}$ to obtain $$\hat{D}_{1,T}^{1}.$$

For example, a first cross-attention layer of the refinement network 1160 receives as input the reconstruction queries $Q_{reconstruction,1,T}$ 1122 and the motion queries $Q_{motion,1,T}$ 1132 and generates as output the cross-attended features $Q_{all}$.

The second cross-attention layer of the refinement network 1160 receives as input the cross-attended features $Q_{all}$, and cross-attends $Q_{all}$ with the self-attended initial coarse depth predictions $$\hat{D}_{1,T}\left(= \hat{D}_{1,T}^{0}\right)$$

1150 from the self-attention layer of the refinement network 1160. The second cross-attention layer of the refinement network 1160 generates as output the refined depth feature information $$\hat{D}_{1,T}^{1},$$

as shown in FIG. 11.

The refinement network architecture 1100 can be used to perform a progressive refinement process for N steps to obtain final high quality (e.g., refined) depth prediction $$D_{1,T}\left(= D_{1,T}^{N}\right)1170,$$

1170, which may be the same as the refined depth 670 of FIG. 6, 570 of FIGS. 5, and/or 470 of FIG. 4, etc.

In some aspects, the video depth estimation machine learning network 600 of FIG. 6 (and/or 500 of FIG. 5, 400 of FIG. 4, etc.) can be trained using stage-wise training. For example, different components or sub-networks of the video depth estimation machine learning network 600 can be trained using different, respective losses corresponding to the respective objective(s) associated with each component or sub-network.

In one illustrative example, the loss $\mathcal{L}_{fut}$ of Eq. (2) can be used to train the future prediction network 630 of FIG. 6 and the loss $\mathcal{L}_{recon}$ of Eq. (1) can be used to train the reconstruction network 620 of FIG. 6.

The encoder 610, decoder 640, and refinement network 660 of FIG. 6 can be trained using the loss $\mathcal{L}_{depth}$, given as:

$$\mathcal{L}_{sl}\left(\hat{D}_{t}^{i}, D_{t}^{gt}\right) = \alpha\sqrt{\frac{1}{n}\sum_{k}(\delta d_{k})^{2} - \frac{\lambda}{n^{2}}\left(\sum_{k}\delta d_{k}\right)^{2}}, \qquad \text{Eq. (3)}$$

$$\mathcal{L}_{depth} = \frac{1}{NT}\sum_{i=0}^{N}\sum_{t=1}^{T}\mathcal{L}_{sl}\left(\hat{D}_{t}^{i}, D_{t}^{gt}\right)$$

In Eq. (3), the term $$\delta d_{k} = \log\hat{D}_{t}^{i}(k) - \log D_{t}^{gt}(k).$$

The term $$D_{t}^{gt}$$

represents the ground-truth depth information for the input video frame $I_t$, where $I_t \in I_{1,T}$ and corresponding $$\hat{D}_{t}^{i} \in \hat{D}_{1,T}^{i}.$$

Also in Eq. (3), the loss Est corresponds to and can be used to train the adaptive sampler network within the reconstruction network 620 of FIG. 6. For example, the adaptive sampler network 716a of FIG. 7A and/or the adaptive sampler network 716b of FIG. 7B can be updated during training using the lost $\mathcal{L}_{sl}(\hat{D}_{1,T}$, $$D_{1,T}^{gt}\right)$$

of Eq. (3) (e.g., using SILog loss between the depth prediction $\hat{D}_{1,T}$ and the ground-truth depth $$D_{1,T}^{gt}.$$

The reconstruction network 620 of FIG. 6 can be trained using the loss $\mathcal{L}_{recon}$ of Eq. (1) and the future prediction network 630 can be trained using the loss $\mathcal{L}_{fut}$ of Eq. (2).

The systems and techniques described herein can be used to perform video depth estimation using machine-learning based feature reconstruction. For example, a reconstruction-aware network (e.g., reconstruction network 420 of FIG. 4, 520 of FIG. 5, 620 of FIG. 6, 720a of FIG. 7A, 720b of FIG. 7B, etc.) can implement a reconstruction-aware query generator that generates queries to capture key visual features in an input scene of a sequence of video frames (e.g., video frames 402 of FIG. 4, 502 of FIG. 5, 602 of FIG. 6, etc.).

The reconstruction queries can be used to cross-attend to decoder features to improve depth estimation (e.g., the reconstruction queries 622,522,422 can cross-attend to the decoder 640,540,440 features to improve the initial depth estimation 650,550,450 respectively, of FIGS. 6, 5, and 4).

The reconstruction queries can additionally be used to enhance the encoder-generated feature volume, such as the enhanced feature volume 625 of FIG. 6 generated by using the reconstruction network 620 and/or reconstruction queries 622 to enhance the encoder 610 initial feature volume 615. The enhanced feature volume 525 of FIG. 5 can be generated by using the reconstruction network 520 and/or reconstruction queries 522 to enhance the encoder 510 initial feature volume 515.

The enhanced feature volume generated by the reconstruction-aware network can be provided to the decoder to improve the initial depth prediction of the decoder. For example, one or more of the enhanced feature volumes 525 of FIG. 5, 625 of FIG. 6, 725a of FIG. 7A, 725b of FIG. 7B, etc., can be used by one or more of the decoders 440 of FIG. 4, 540 of FIG. 5, 640 of FIG. 6 to generate an improved initial depth prediction 450 of FIG. 4, 550 of FIG. 5, 650 of FIG. 6, 1150 of FIG. 11, etc.

In some aspects, the reconstruction network (e.g., 420 of FIG. 4, 520 of FIG. 5, 620 of FIG. 6, 720a of FIG. 7A, 720b of FIG. 7B) can be trained to reconstruct a masked feature volume during training, for example as described with respect to FIGS. 7A and 7B and the masked feature volumes 718a, 718b, respectively. An adaptive sampling network 716a of FIG. 7A and/or 716b of FIG. 7B can be used to mask out features of a feature volume during training of the reconstruction network. In some aspects, random sampling may also be used to mask out features of a feature volume to train the reconstruction network.

A motion-aware network 430 of FIG. 4, 530 of FIG. 5, 630 of FIG. 6, 980 of FIG. 9A, 930 of FIG. 9B, etc., (also referred to as a motion prediction network and/or a future prediction network) can be used to generate motion queries to capture key motion features in the scene, which cross-attend to decoder features to improve depth estimation. The motion-aware network can be trained to predict future feature volume based on current feature volume during training. Cross-attention between reconstruction-aware and prediction-aware queries and features can be implemented in the depth prediction decoder (e.g., 640 of FIG. 6, 540 of FIG. 5, 440 of FIG. 4, etc.).

Cross-attention-based additional refinement on predicted depth maps can be performed by the refinement network 660 of FIG. 6, 560 of FIG. 5, 460 of FIG. 4, etc., using the cross-attention layers 665, 565, 465, respectively, to refine the predicted initial depth maps 650, 550, 450, respectively. For example, given the initial predicted depth maps, the reconstruction-aware and prediction-aware queries are used again to cross-attend to the initial depth maps to refine them into the refined depth estimates 670 of FIG. 6, 570 of FIG. 5, 470 of FIG. 4, 1170 of FIG. 11, etc.

In some aspects, the systems and techniques can use an encoder-decoder architecture, where the encoder (e.g., encoder 410, 510, 610, etc.) can be implemented using various pre-trained CNN or transformer based architectures (e.g., ResNet34, vision transformer (ViT), shifted window transformer (Swin), etc.) and the decoder (e.g., decoder 440, 540, 640, etc.) includes four skip attention modules, such as the skip attention module 726 of FIG. 7B. In some examples, Swin-Large can be used as the encoder.

Experimental hyperparameters are described below. The number of frames in the video sequence $I_{1,T}$ were set as T=4. While selecting subsequent frames for video sequence $I_{1,T}$, the in between frames are interleaved (e.g., sample frames at a uniform rate $r \in [1, 3]$) for better coverage of the number of frames and to also handle the larger motions of the objects. The number of iterations in future prediction was set as L=T unless specified otherwise. The number of refinement iterations was set as N=3. The initial learning rate was set to $4 \times 10^5$ and then linearly decreased to $4 \times 10^6$ across the example experimental training iterations.

In an example experimental training, a stage-wise approach was used to train the video depth prediction networks described herein. In the first stage, the encoder and decoder are trained with SILog loss between coarse depth prediction and ground-truth depth $\mathcal{L}_{sl}(\hat{D}_{1,T},$ $$D_{1,T}^{gt})$$

for epochs. The reconstruction network and adaptive sampler are trained in an iterative manner with the respective losses described above in Eqs. (1)-(3) for 5 epochs. The first stage training can be performed to have better initializations when training all components of the network together.

In second stage training, future prediction weights can be initialized with pre-trained first stage weights of the reconstruction network for better initialization. In the second stage training, the system components are trained together in an iterative manner. Second stage training can include four steps: (1) freeze all the weights in the network except for the weights in the adaptive sampler; given video sequences $I_{1,T}$ the corresponding masks $M_{1,T}$ are computed and the adaptive sampler is trained using the corresponding loss $\mathcal{L}_{sl}(\hat{D}_{1,T},$ $$D_{1,T}^{gt})$$

of Eq. (3). (2) freeze all the weights in the network except for the weights of the reconstruction network; given video sequences $I_{1,T}$ the masked feature volume $M_{1,T} \odot V_{1,T}$ is computed, and the reconstructed feature volume along with $Q_{recon,1,T}$ is computed. Using $Q_{recon,1,T}$, the coarse depth prediction is computed and the reconstruction network weights are updated using the loss of Eq. (1). (3) freeze all the weights in the network except for the weights of the future prediction network; given video sequences $I_{1,T}$, compute the feature volume $V_{1,T}$, and compute the future feature volume predictions along with $Q_{motion,1,T}$. Using $Q_{motion,1,T}$, the coarse depth prediction is computed and the reconstruction network weights are updated using the loss of Eq. (2). (4) In the last step, freeze the adaptive sampler, reconstruction network and future prediction network weights. Unfreeze the video depth prediction encoder, the video depth prediction decoder, and the refinement network weights. Given video sequences $I_{1,T}$, pass $I_{1,T}$ as input to the video depth prediction encoder to compute the feature volume $V_{1,T}$, and further feature volume $M_{1,T}$ is used as input to the reconstruction network and the future prediction network to queries $Q_{recon,1,T}$ and $Q_{motion,1,T}$ respectively, as well as enhanced feature volume $\hat{V}_{1,T}$. Using $\hat{V}_{1,T}$, $Q_{recon,1,T}$ and $Q_{motion,1,T}$ as input to video depth prediction decoder, the initial coarse depth maps $\hat{D}_{1,T}$ are obtained. The coarse depth map $\hat{D}_{1,T}$ is refined using the refinement network to obtain the high quality depth map (e.g., refined depth map) $D_{1,T}$. The video depth prediction encoder, decoder, and refinement network weights are updated using the loss of Eq. (3).

For testing and evaluation, all the weights of the components of the video depth estimation network were set in evaluation mode. Given video frame sequences $I_{1,T}$, the same procedure explained in the fourth step of the second stage training of the network (e.g., see above) was used to corresponding obtain high quality (e.g., refined) depth map predictions $D_{1,T}$.

Evaluation was performed using the standard metrics to evaluate the results of the depth estimation models. As the systems and techniques described herein address video depth estimation to compare the temporal consistency between the computed depths, evaluation can be based on computing the following measures:

$$aTC_t = \frac{1}{\sum (K_t == 1)} K_t \left\| \frac{D_t - D_t^w}{D_t} \right\|, \qquad \text{Eq. (4)}$$

$$rTC_t = \frac{1}{\sum (K_t == 1)} K_t \left[ \text{Max}\left( \frac{D_t}{D_t^w}, \frac{D_t^w}{K_t} \right) < thr \right]$$

Here, $K_t$ is a depth validity mask, $D_t$ is predicted depth for $I_t$, and $$D_t^w$$

is warped from $D_{t-1}$ using optical flow. The optical flow can be obtained from FlowFormer, etc.

FIG. 12 is a flowchart diagram illustrating an example of a process 1200 for generating depth information from one or more images using one or more of the techniques described herein. The process 1200 can be performed by a computing device (or apparatus), or a component or system (e.g., one or more chipsets, one or more processors such as one or more CPUs, DSPs, NPUs, NSPs, microcontrollers, ASICs, FPGAs, programmable logic devices, discrete gates or transistor logic components, discrete hardware components, etc., any combination thereof, and/or other component or system) of the computing device or apparatus, utilizing or implementing a neural network or other machine learning model and/or architecture (e.g., the machine learning architecture 400 of FIG. 4, the machine learning architecture 500 of FIG. 5, the machine learning architecture 600 of FIG. 6, the feature reconstruction machine learning network 700a of FIG. 7A, the feature reconstruction machine learning network 700b of FIG. 7B, the future prediction-aware query generator machine learning network 900a of FIG. 9A, the future prediction machine learning network 900b of FIG. 9B, the refinement network architecture 1100 of FIG. 11, etc.). The operations of the process 1200 may be implemented as software components that are executed and run on one or more processors (e.g., processor 1510 of FIG. 15 or other processor(s)). In some examples, the process 1200 can be performed by a computing device comprising a smartphone, mobile computing device, user computer device, etc. The computing device may be a mobile device (e.g., a mobile phone), a network-connected wearable such as a watch, an extended reality (XR) device such as a virtual reality (VR) device or augmented reality (AR) device, a vehicle or component or system of a vehicle, or other type of computing device At block 1202, the computing device (or component thereof) can obtain a first feature volume including visual features corresponding to each respective frame included in the first set of frames. For example, the first feature volume can be the same as or similar to the feature volume 415 of FIG. 4, the feature volume 515 of FIG. 5, the feature volume 615 of FIG. 6, the feature volume 715a of FIG. 7A, the feature volume 715b of FIG. 7B, the feature volume 915a of FIG. 9A, the feature volume 915b of FIG. 9B, etc.

The first set of frames can be the same as or similar to the N video frames 402 of FIG. 4, 502 of FIG. 5, 602 of FIG. 6, etc. In some cases, the first set of frames comprises a first set of consecutive frames of video data between a first time and a second time subsequent to the first time. In some examples, obtaining the first feature volume includes obtaining a sequence of frames of video data including the first set of frames and generating, using an encoder, respective visual features corresponding to each frame of the first set of frames. For example, the encoder can be the same as or similar to the encoder 410 of FIG. 4, 510 of FIG. 5, 610 of FIG. 6, etc. The first feature volume can be generated as a concatenation of the respective visual features corresponding to each frame of the first set of frames, wherein the respective visual features are concatenated in a channel dimension. In some aspects, one or more cameras are configured to capture the first set of frames.

At block 1204, the computing device (or component thereof) can generate, based on the first feature volume and using a first query generator network, one or more reconstruction features associated with a reconstructed feature volume corresponding to the first feature volume. For example, the first query generator network can be the same as or similar to the reconstruction-aware query generator 520 of FIG. 5, 620 of FIG. 6, 720a of FIG. 7A, 720b of FIG. 7B, etc. The one or more reconstruction features can be the same as or similar to the reconstruction query features 422 of FIG. 4, 522 of FIG. 5, 6t22 of FIG. 6, etc. The reconstructed feature volume can be the same as or similar to the reconstructed feature volume 525 of FIG. 5, 625 of FIG. 6, 725a of FIG. 7A, 725b of FIG. 7B, etc.

In some cases, the first query generator network is a reconstruction-aware query generator machine learning network. In some examples, the reconstruction-aware query generator machine learning network is configured to generate reconstruction query features corresponding to scene features of a scene represented in the first set of frames. In some cases, the one or more reconstruction features associated with cross-attention for the initial depth prediction are the same as the one or more reconstruction features associated with cross-attention for the refined depth prediction.

In some examples, the first query generator network can be used to generate an enhanced feature volume based on adaptive masking of the first feature volume. For example, the adaptive masking can be implemented using the adaptive masking sampler 716a of FIG. 7A and/or 716b of FIG. 7B. A depth prediction decoder can be used to generate the features of the depth prediction decoder, wherein the features of the depth prediction decoder are based on the enhanced feature volume. For example, the depth prediction decoder can be the same as or similar to the depth prediction decoder 4340 of FIG. 4, 540 of FIG. 5, 640 of FIG. 6, etc. In some cases, the enhanced feature volume is a reconstructed feature volume corresponding to an adaptively masked version of the first feature volume. The adaptively masked version of the first feature volume can be the same as or similar to the masked feature volume 718a of FIG. 7A and/or 718b of FIG. 7B. In some cases, the adaptively masked version of the first feature volume can be generated using an adaptive sampler machine learning network jointly trained with the first query generator network. The adaptive sampler machine learning network can be the same as or similar to the adaptive masking sampler 716a of FIG. 7A and/or 716b of FIG. 7B. The reconstructed feature volume can be generated based on reconstructing the first feature volume from the adaptively masked version of the first feature volume using the first query generator network. In some cases, the one or more reconstruction features are associated with using the first query generator network to reconstruct the first feature volume from the adaptively masked version of the first feature volume.

At block 1206, the computing device (or component thereof) can generate, based on the first feature volume and using a second query generator network, one or more motion features associated with predicted future motion corresponding to the first feature volume. For example, the second query generator network can be the same as or similar to the motion-aware query generator 430 of FIGS. 4 and/or 530 of FIG. 5, the future prediction network 630 of FIG. 6, 980 of FIG. 9A, and/or 930 of FIG. 9B, etc. The one or more motion features can be the same as or similar to the motion-aware query features 432 of FIG. 4, 532 of FIG. 5, 632 of FIGS. 6, and/or 932 of FIG. 9B, etc.

In some examples, the second query generator network is a motion-aware query generator machine learning network configured to generate motion query features corresponding to future motion predictions of objects within the scene represented in the first set of frames. In some cases, the future motion predictions can be the same as or similar to the future motion predictions of FIG. 10, and/or the future motion predictions 985-1, . . . , 985-M of FIG. 9A, and/or the future motion predictions 995-1, . . . , 995-L of FIG. 9B, etc. In some cases, the one or more motion features associated with cross-attention for the initial depth prediction are the same as the one or more motion features associated with cross-attention for the refined depth prediction.

In some examples, the one or more motion features comprise attention maps obtained from a last layer of the first query generator network, based on processing the first feature volume using the first query generator network. In some cases, the one or more motion features comprise attention maps obtained from a last layer of the second query generator network from a final iteration step of a plurality of iteration steps performed by the second query generator network to predict a future motion corresponding to the first feature volume. For example, the one or more motion features can be the same as or similar to the motion features 932 obtained from the last layer of the future prediction network 930 of FIG. 9B. In some cases, the second query generator network comprises a reconstruction-aware motion prediction network including a self-attention layer and a plurality of skip-attention module (SAM) layers. For example, the self-attention layer can be the same as or similar to the self-attention layer included in the future prediction network 930 of FIG. 9B. The plurality of SAM layers can be the same as or similar to the plurality of SAM layers included in the future prediction network 930 of FIG. 9B. In some examples, the SAM layers can have an architecture the same as or similar to the SAM 726 of FIG. 7B. In some cases, the last layer of the second query generator network comprises a last SAM layer of the plurality of SAM layers.

At block 1208, the computing device (or component thereof) can generate an initial depth prediction for each respective frame included in the first set of frames, based on cross-attention between features of a depth prediction decoder, the one or more reconstruction features, and the one or more motion features. For example, the initial depth prediction can be the same as or similar to the initial depth prediction 450 of FIG. 4, 550 of FIG. 5, 650 of FIGS. 6, and/or 1150 of FIG. 11, etc. The cross-attention can be the same as or similar to the cross-attention layers 445 of FIG. 4, 545 of FIG. 5, 645 of FIG. 6, 1165 of FIG. 11, etc.

In some examples, a depth prediction decoder can be user to generate the features of the depth prediction decoder, wherein the features of the depth prediction decoder are based on the first feature volume. In some cases, the initial depth prediction can be generated based on cross-attending the features of the depth prediction decoder using the one or more reconstruction features and the one or more motion features to generate cross-attended decoder features. Subsequently, the depth prediction decoder can be used to generate the initial depth prediction based on the cross-attended decoder features.

At block 1210, the computing device (or component thereof) can generate a refined depth prediction for each respective frame included in the first set of frames, based on cross-attention between the initial depth prediction, the one or more reconstruction features, and the one or more motion features. For example, the refined depth prediction can be the same as or similar to the refined depths 470 of FIG. 4, 570 of FIG. 5, 670 of FIGS. 6, and/or 1170 of FIG. 11, etc.

In some examples, the refined depth prediction can be generated based on cross-attending, using a depth refinement machine learning network, information associated with the initial depth prediction using the one or more reconstruction features and the one or more motion features to generate cross-attended depth prediction features. For example, the depth refinement machine learning network can be the same as or similar to the refinement network 460 of FIG. 4, 560 of FIG. 5, 660 of FIGS. 6, and/or 1160 of FIG. 11, etc. The cross-attention can be implemented using one or more cross-attention layers the same as or similar to the cross-attention layers 465 of FIG. 4, 565 of FIG. 5, 665 of FIGS. 6, and/or 1165 of FIG. 11. In some examples, the depth refinement machine learning network can be used to generate the refined depth prediction based on the cross-attended depth prediction features.

As noted above, the processes described herein (e.g., process 1200 and/or any other process described herein) may be performed by a computing device or apparatus utilizing or implementing a neural network or other machine learning model and/or architecture (e.g., the machine learning architecture 400 of FIG. 4, the machine learning architecture 500 of FIG. 5, the machine learning architecture 600 of FIG. 6, the feature reconstruction machine learning network 700a of FIG. 7A, the feature reconstruction machine learning network 700b of FIG. 7B, the future prediction-aware query generator machine learning network 900a of FIG. 9A, the future prediction machine learning network 900b of FIG. 9B, the refinement network architecture 1100 of FIG. 11, etc.). In one example, the process 1200 can be performed by the electronic device 100 of FIG. 1. In another example, the process 1200 can be performed by the computing system having the computing device architecture of the computing system 1500 shown in FIG. 15 utilizing or implementing a neural network or other machine learning model and/or architecture (e.g., the machine learning architecture 400 of FIG. 4, the machine learning architecture 500 of FIG. 5, the machine learning architecture 600 of FIG. 6, etc.). For example, a computing device with the computing device architecture of the computing system 1500 shown in FIG. 15 can implement the operations of FIG. 12 and/or the components and/or operations described herein with respect to any of FIGS. 3 through 12.

The computing device can include any suitable device, such as a mobile device (e.g., a mobile phone), a desktop computing device, a tablet computing device, an XR device (e.g., a VR headset, an AR headset, AR glasses, etc.), a wearable device (e.g., a network-connected watch or smart-watch, or other wearable device), a server computer, a vehicle (e.g., an autonomous vehicle) or computing device of the vehicle, a robotic device, a laptop computer, a smart television, a camera, and/or any other computing device with the resource capabilities to perform the processes described herein, including the process 1200 and/or any other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUS), digital signal processors (DSPs), central processing units (CPUs), and/or other suitable electronic circuits), and/or can include and/or be implemented using computer software, firmware, or any combination thereof, to perform the various operations described herein.

The process 1200 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1200 and/or any other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 13:
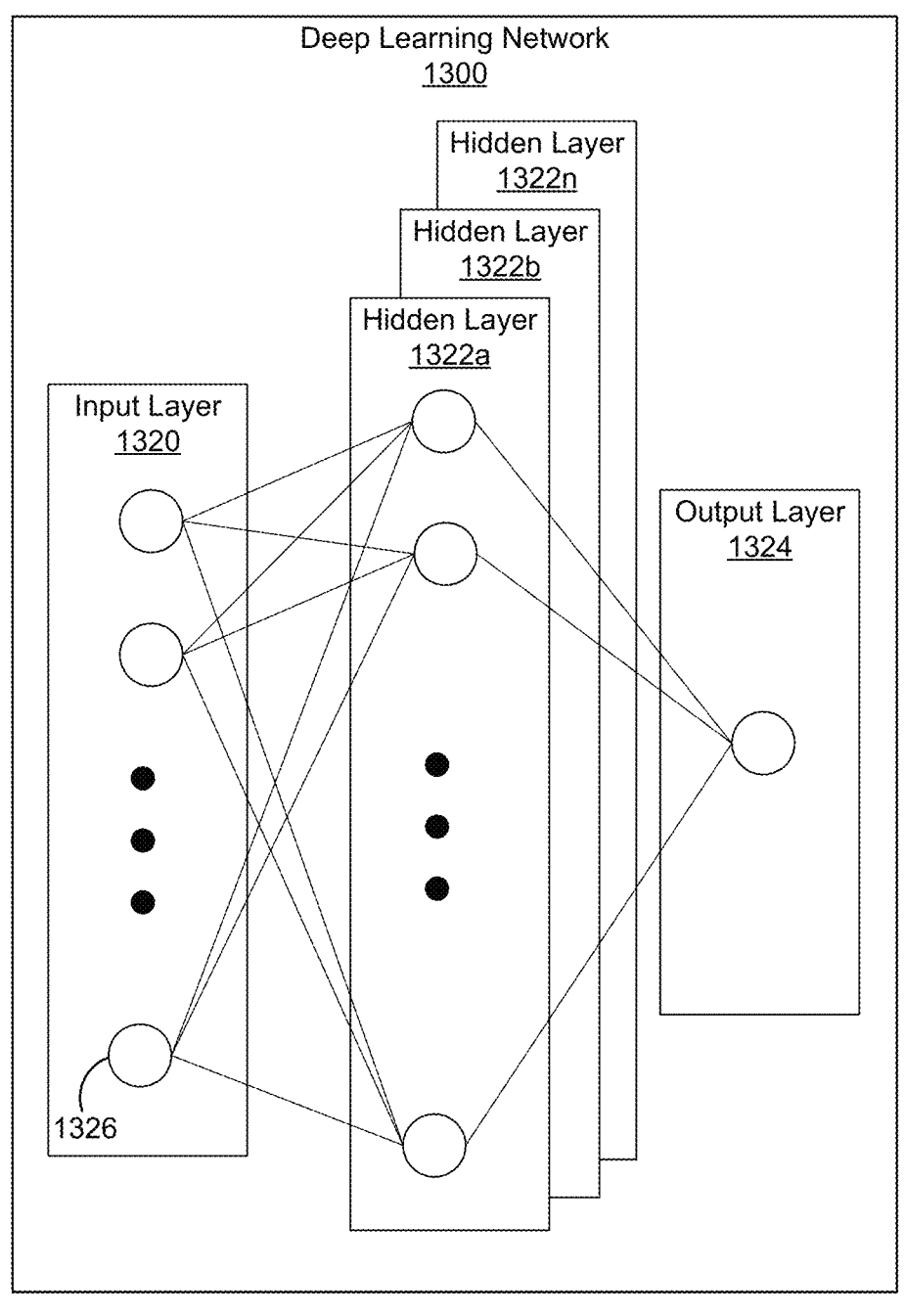
FIG. 13 is a block diagram illustrating an example of a deep learning network, in accordance with some examples.

FIG. 13 is an illustrative example of a deep learning neural network 1300 that can be used the machine learning architecture 400 of FIG. 4, the machine learning architecture 500 of FIG. 5, the machine learning architecture 600 of FIG. 6, and/or the various machine learning networks, systems, and/or architectures of any of FIGS. 4-11. An input layer 1320 includes input data. In one illustrative example, the input layer 1320 can include data representing the pixels of an input video frame. The neural network 1300 includes multiple hidden layers 1322a, 1322b, through 1322n. The hidden layers 1322a, 1322b, through 1322n include "n" number of hidden layers, where "n" is an integer greater than or equal to one. The number of hidden layers can be made to include as many layers as needed for the given application. The neural network 1300 further includes an output layer 1324 that provides an output resulting from the processing performed by the hidden layers 1322a, 1322b, through 1322n. In one illustrative example, the output layer 1324 can provide a classification for an object in an input video frame. The classification can include a class identifying the type of object (e.g., a person, a dog, a cat, or other object).

The neural network 1300 is a multi-layer neural network of interconnected nodes. Each node can represent a piece of information. Information associated with the nodes is shared among the different layers and each layer retains information as information is processed. In some cases, the neural network 1300 can include a feed-forward network, in which case there are no feedback connections where outputs of the network are fed back into itself. In some cases, the neural network 1300 can include a recurrent neural network, which can have loops that allow information to be carried across nodes while reading in input.

Information can be exchanged between nodes through node-to-node interconnections between the various layers. Nodes of the input layer 1320 can activate a set of nodes in the first hidden layer 1322a. For example, as shown, each of the input nodes of the input layer 1320 is connected to each of the nodes of the first hidden layer 1322a. The nodes of the hidden layers 1322a, 1322b, through 1322n can transform the information of each input node by applying activation functions to the information. The information derived from the transformation can then be passed to and can activate the nodes of the next hidden layer 1322b, which can perform their own designated functions. Example functions include convolutional, up-sampling, data transformation, and/or any other suitable functions. The output of the hidden layer 1322b can then activate nodes of the next hidden layer, and so on. The output of the last hidden layer 1322n can activate one or more nodes of the output layer 1324, at which an output is provided. In some cases, while nodes (e.g., node 1326) in the neural network 1300 are shown as having multiple output lines, a node has a single output and all lines shown as being output from a node represent the same output value.

In some cases, each node or interconnection between nodes can have a weight that is a set of parameters derived from the training of the neural network 1300. Once the neural network 1300 is trained, it can be referred to as a trained neural network, which can be used to classify one or more objects. For example, an interconnection between nodes can represent a piece of information learned about the interconnected nodes. The interconnection can have a tunable numeric weight that can be tuned (e.g., based on a training dataset), allowing the neural network 1300 to be adaptive to inputs and able to learn as more and more data is processed.

The neural network 1300 is pre-trained to process the features from the data in the input layer 1320 using the different hidden layers 1322a, 1322b, through 1322n in order to provide the output through the output layer 1324. In an example in which the neural network 1300 is used to identify objects in images, the neural network 1300 can be trained using training data that includes both images and labels. For example, training images can be input into the network, with each training image having a label indicating the classes of the one or more objects in each image (basically, indicating to the network what the objects are and what features they have). In one illustrative example, a training image can include an image of a number 2, in which case the label for the image can be [0 0 1 0 0 0 0 0 0 0].

In some cases, the neural network 1300 can adjust the weights of the nodes using a training process called back-propagation. Backpropagation can include a forward pass, a loss function, a backward pass, and a weight update. The forward pass, loss function, backward pass, and parameter update is performed for one training iteration. The process can be repeated for a certain number of iterations for each set of training images until the neural network 1300 is trained well enough so that the weights of the layers are accurately tuned.

For the example of identifying objects in images, the forward pass can include passing a training image through the neural network 1300. The weights are initially randomized before the neural network 1300 is trained. The image can include, for example, an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

For a first training iteration for the neural network 1300, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network 1300 is unable to determine low level features and thus cannot make an accurate determination of what the classification of the object might be. A loss function can be used to analyze error in the output. Any suitable loss function definition can be used. One example of a loss function includes a mean squared error (MSE). The MSE is defined as $$E_{total} = \sum \frac{1}{2}(\text{target} - \text{output})^2,$$

which calculates the sum of one-half times a ground truth output (e.g., the actual answer) minus the predicted output (e.g., the predicted answer) squared. The loss can be set to be equal to the value of $E_{total}$.

The loss (or error) will be high for the first training images since the actual values will be much different than the predicted output. The goal of training is to minimize the amount of loss so that the predicted output is the same as the training label. The neural network 1300 can perform a backward pass by determining which inputs (weights) most contributed to the loss of the network, and can adjust the weights so that the loss decreases and is eventually minimized.

A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta \frac{dL}{dW},$$

where w denotes a weight, $w_i$ denotes the initial weight, and n denotes a learning rate. The learning rate can be set to any suitable value, with a high learning rate including larger weight updates and a lower value indicating smaller weight updates.

The neural network 1300 can include any suitable deep network. One example includes a convolutional neural network (CNN), which includes an input layer and an output layer, with multiple hidden layers between the input and out layers. An example of a CNN is described below with respect to FIG. 14. The hidden layers of a CNN include a series of convolutional, nonlinear, pooling (for downsampling), and fully connected layers. The neural network 1300 can include any other deep network other than a CNN, such as an autoencoder, a deep belief nets (DBNs), a Recurrent Neural Networks (RNNs), among others.

Figure 14:
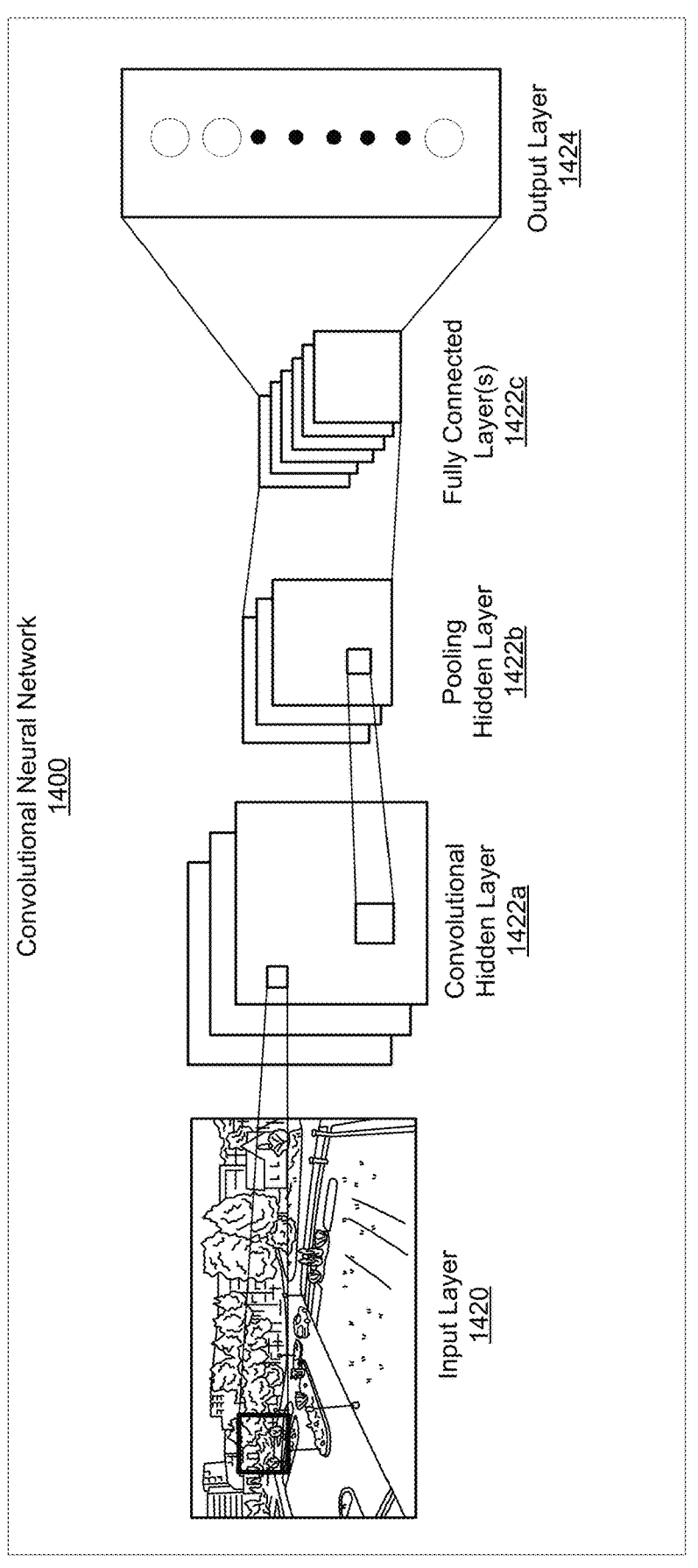
FIG. 14 is a block diagram illustrating an example of a convolutional neural network, in accordance with some examples.

FIG. 14 is an illustrative example of a convolutional neural network 1400 (CNN 1400). The input layer 1420 of the CNN 1400 includes data representing an image. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 1422a, an optional non-linear activation layer, a pooling hidden layer 1422b, and fully connected hidden layers 1422c to get an output at the output layer 1424. While only one of each hidden layer is shown in FIG. 14, one of ordinary skill will appreciate that multiple convolutional hidden layers, non-linear layers, pooling hidden layers, and/or fully connected layers can be included in the CNN 1400. As previously described, the output can indicate a single class of an object or can include a probability of classes that best describe the object in the image.

The first layer of the CNN 1400 is the convolutional hidden layer 1422a. The convolutional hidden layer 1422a analyzes the image data of the input layer 1420. Each node of the convolutional hidden layer 1422a is connected to a region of nodes (pixels) of the input image called a receptive field. The convolutional hidden layer 1422a can be considered as one or more filters (each filter corresponding to a different activation or feature map), with each convolutional iteration of a filter being a node or neuron of the convolutional hidden layer 1422a. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 1422a. Each connection between a node and a receptive field for that node learns a weight and, in some cases, an overall bias such that each node learns to analyze its particular local receptive field in the input image. Each node of the hidden layer 1422a will have the same weights and bias (called a shared weight and a shared bias). For example, the filter has an array of weights (numbers) and the same depth as the input. A filter will have a depth of 3 for the video frame example (according to three color components of the input image). An illustrative example size of the filter array is 5×5×3, corresponding to a size of the receptive field of a node.

The convolutional nature of the convolutional hidden layer 1422*a* is due to each node of the convolutional layer being applied to its corresponding receptive field. For example, a filter of the convolutional hidden layer 1422*a* can begin in the top-left corner of the input image array and can convolve around the input image. As noted above, each convolutional iteration of the filter can be considered a node or neuron of the convolutional hidden layer 1422*a*. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 1422*a*.

For example, a filter can be moved by a step amount to the next receptive field. The step amount can be set to 1 or other suitable amount. For example, if the step amount is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 1422*a*.

The mapping from the input layer to the convolutional hidden layer 1422*a* is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a step amount of 1) of a 28×28 input image. The convolutional hidden layer 1422*a* can include several activation maps in order to identify multiple features in an image. The example shown in FIG. 14 includes three activation maps. Using three activation maps, the convolutional hidden layer 1422*a* can detect three different kinds of features, with each feature being detectable across the entire image.

In some examples, a non-linear hidden layer can be applied after the convolutional hidden layer 1422*a*. The non-linear layer can be used to introduce non-linearity to a system that has been computing linear operations. One illustrative example of a non-linear layer is a rectified linear unit (ReLU) layer. A ReLU layer can apply the function f(x)=max(0, x) to all of the values in the input volume, which changes all the negative activations to 0. The ReLU can thus increase the non-linear properties of the CNN 1400 without affecting the receptive fields of the convolutional hidden layer 1422*a*.

The pooling hidden layer 1422*b* can be applied after the convolutional hidden layer 1422*a* (and after the non-linear hidden layer when used). The pooling hidden layer 1422*b* is used to simplify the information in the output from the convolutional hidden layer 1422*a*. For example, the pooling hidden layer 1422*b* can take each activation map output from the convolutional hidden layer 1422*a* and generates a condensed activation map (or feature map) using a pooling function. Max-pooling is one example of a function performed by a pooling hidden layer. Other forms of pooling functions be used by the pooling hidden layer 1422*a*, such as average pooling, L2-norm pooling, or other suitable pooling functions. A pooling function (e.g., a max-pooling filter, an L2-norm filter, or other suitable pooling filter) is applied to each activation map included in the convolutional hidden layer 1422*a*. In the example shown in FIG. 14, three pooling filters are used for the three activation maps in the convolutional hidden layer 1422*a*.

In some examples, max-pooling can be used by applying a max-pooling filter (e.g., having a size of 2×2) with a step amount (e.g., equal to a dimension of the filter, such as a step amount of 2) to an activation map output from the convolutional hidden layer 1422*a*. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 1422*a* having a dimension of 24×24 nodes, the output from the pooling hidden layer 1422*b* will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling), and using the computed values as an output.

Intuitively, the pooling function (e.g., max-pooling, L2-norm pooling, or other pooling function) determines whether a given feature is found anywhere in a region of the image, and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 1400.

The final layer of connections in the network is a fully-connected layer that connects every node from the pooling hidden layer 1422*b* to every one of the output nodes in the output layer 1424. Using the example above, the input layer includes 28×28 nodes encoding the pixel intensities of the input image, the convolutional hidden layer 1422*a* includes 3×24×24 hidden feature nodes based on application of a 5×5 local receptive field (for the filters) to three activation maps, and the pooling layer 1422*b* includes a layer of 3×12×12 hidden feature nodes based on application of max-pooling filter to 2×2 regions across each of the three feature maps. Extending this example, the output layer 1424 can include ten output nodes. In such an example, every node of the 3×12×12 pooling hidden layer 1422*b* is connected to every node of the output layer 1424.

The fully connected layer 1422*c* can obtain the output of the previous pooling layer 1422*b* (which should represent the activation maps of high-level features) and determines the features that most correlate to a particular class. For example, the fully connected layer 1422*c* layer can determine the high-level features that most strongly correlate to a particular class, and can include weights (nodes) for the high-level features. A product can be computed between the weights of the fully connected layer 1422c and the pooling hidden layer 1422b to obtain probabilities for the different classes. For example, if the CNN 1400 is being used to predict that an object in a video frame is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 1424 can include an M-dimensional vector (in the prior example, M=10), where M can include the number of classes that the program has to choose from when classifying the object in the image. Other example outputs can also be provided. Each number in the N-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

In some aspects, training of one or more of the machine learning systems or neural networks described herein (e.g., such as the fully connected neural network 202 of FIG. 2A, the locally connected neural network 204 of FIG. 2B, the convolutional network 206 of FIG. 2C, the video depth estimation machine learning system 400 of FIG. 4, the video depth estimation machine learning system 500 of FIG. 5, the video depth estimation machine learning network 600 of FIG. 6, the feature reconstruction machine learning network 700a of FIG. 7A, the feature reconstruction machine learning network 700b of FIG. 7B, the future prediction-aware query generator machine learning network 900a of FIG. 9A, the future prediction machine learning network 900b of FIG. 9B, the refinement network architecture 1100 of FIG. 11, among various other machine learning networks or components described herein) can be performed using online training (e.g., in some case on-device training), offline training, and/or various combinations of online and offline training. In some cases, online may refer to time periods during which the input data (e.g., such as the video frames 402 of FIG. 4, the video frames 502 of FIG. 5, etc.) is processed, for instance for performance of the video depth estimation implemented by the systems and techniques described herein. In some examples, offline may refer to idle time periods or time periods during which input data is not being processed. Additionally, offline may be based on one or more time conditions (e.g., after a particular amount of time has expired, such as a day, a week, a month, etc.) and/or may be based on various other conditions such as network and/or server availability, etc., among various others. In some aspects, offline training of a machine learning model (e.g., a neural network model) can be performed by a first device (e.g., a server device) to generate a pre-trained model, and a second device can receive the trained model from the second device. In some cases, the second device (e.g., a mobile device, an XR device, a vehicle or system/component of the vehicle, or other device) can perform online (or on-device) training of the pre-trained model to further adapt or tune the parameters of the model.

Figure 15:
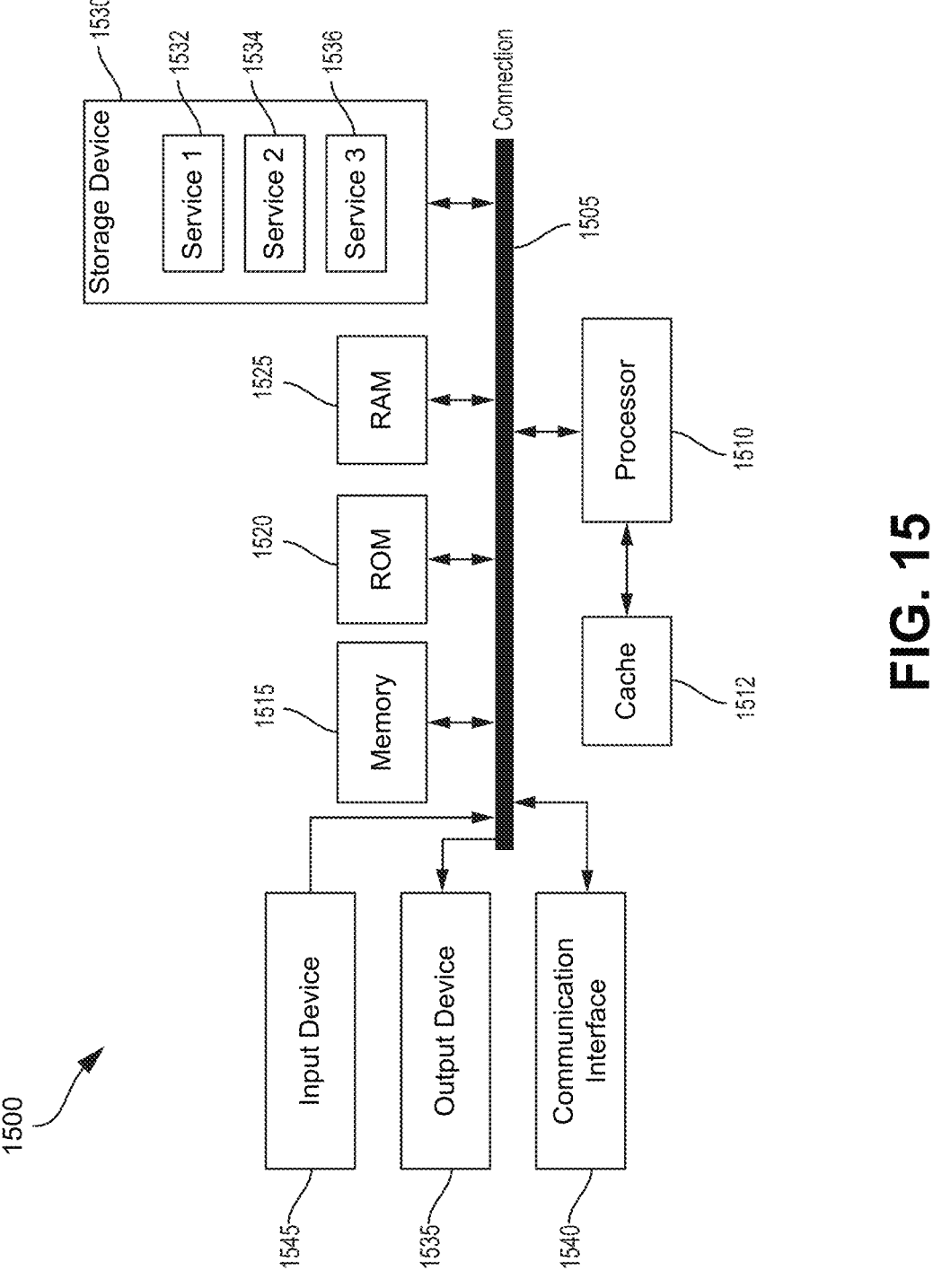
FIG. 15 is a block diagram illustrating an example of a computing system, which may be employed by the disclosed systems and techniques, in accordance with some examples.

FIG. 15 is a diagram illustrating an example of a system for implementing certain aspects of the present disclosure. In particular, FIG. 15 illustrates an example of computing system 1500, which can be for example any computing device making up a computing system, a camera system, or any component thereof in which the components of the system are in communication with each other using connection 1505. Connection 1505 can be a physical connection using a bus, or a direct connection into processor 1510, such as in a chipset architecture. Connection 1505 can also be a virtual connection, networked connection, or logical connection.

In some examples, computing system 1500 is a distributed system in which the functions described in this disclosure can be distributed within a datacenter, multiple data centers, a peer network, etc. In some examples, one or more of the described system components represents many such components each performing some or all of the function for which the component is described. In some examples, the components can be physical or virtual devices.

Example system 1500 includes at least one processing unit (CPU or processor) 1510 and connection 1505 that couples various system components including system memory 1515, such as read-only memory (ROM) 1520 and random access memory (RAM) 1525 to processor 1510. Computing system 1500 can include a cache 1512 of high-speed memory connected directly with, in close proximity to, or integrated as part of processor 1510.

Processor 1510 can include any general purpose processor and a hardware service or software service, such as services 1532, 1534, and 1536 stored in storage device 1530, configured to control processor 1510 as well as a special-purpose processor where software instructions are incorporated into the actual processor design. Processor 1510 may essentially be a completely self-contained computing system, containing multiple cores or processors, a bus, memory controller, cache, etc. A multi-core processor may be symmetric or asymmetric.

To enable user interaction, computing system 1500 includes an input device 1545, which can represent any number of input mechanisms, such as a microphone for speech, a touch-sensitive screen for gesture or graphical input, keyboard, mouse, motion input, speech, etc. Computing system 1500 can also include output device 1535, which can be one or more of a number of output mechanisms. In some instances, multimodal systems can enable a user to provide multiple types of input/output to communicate with computing system 1500. Computing system 1500 can include communications interface 1540, which can generally govern and manage the user input and system output.

The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 1540 may also include one or more Global Navigation Satellite System (GNSS) receivers or transceivers that are used to determine a location of the computing system 1500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1530 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1530 can include software services, servers, services, etc., that when the code that defines such software is executed by the processor 1510, it causes the system to perform a function. In some examples, a hardware service that performs a particular function can include the software component stored in a computer-readable medium in connection with the necessary hardware components, such as processor 1510, connection 1505, output device 1535, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some examples the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random-access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

Illustrative aspects of the disclosure include:

Aspect 1. An apparatus for generating depth information, the apparatus comprising: one or more memories configured to store a first set of frames; and one or more processors coupled to the one or more memories, the one or more processors being configured to: obtain a first feature volume including visual features corresponding to each respective frame included in the first set of frames; generate, based on the first feature volume and using a first query generator network, one or more reconstruction features associated with a reconstructed feature volume corresponding to the first feature volume; generate, based on the first feature volume and using a second query generator network, one or more motion features associated with predicted future motion corresponding to the first feature volume; generate an initial depth prediction for each respective frame included in the first set of frames, based on cross-attention between features of a depth prediction decoder, the one or more reconstruction features, and the one or more motion features; and generate a refined depth prediction for each respective frame included in the first set of frames, based on cross-attention between the initial depth prediction, the one or more reconstruction features, and the one or more motion features.

Aspect 2. The apparatus of Aspect 1, wherein the one or more processors are configured to: generate, using a depth prediction decoder, the features of the depth prediction decoder, wherein the features of the depth prediction decoder are based on the first feature volume.

Aspect 3. The apparatus of any of Aspects 1 to 2, wherein the one or more processors are configured to: generate, using the first query generator network, an enhanced feature volume based on adaptive masking of the first feature volume; and generate, using a depth prediction decoder, the features of the depth prediction decoder, wherein the features of the depth prediction decoder are based on the enhanced feature volume.

Aspect 4. The apparatus of Aspect 3, wherein the enhanced feature volume is a reconstructed feature volume corresponding to an adaptively masked version of the first feature volume.

Aspect 5. The apparatus of Aspect 4, wherein the one or more processors are configured to: generate the adaptively masked version of the first feature volume using an adaptive sampler machine learning network jointly trained with the first query generator network; and generate the reconstructed feature volume based on reconstructing the first feature volume from the adaptively masked version of the first feature volume using the first query generator network.

Aspect 6. The apparatus of any of Aspects 4 to 5, wherein the one or more reconstruction features are associated with using the first query generator network to reconstruct the first feature volume from the adaptively masked version of the first feature volume.

Aspect 7. The apparatus of any of Aspects 1 to 6, wherein the one or more motion features comprise attention maps obtained from a last layer of the first query generator network, based on processing the first feature volume using the first query generator network.

Aspect 8. The apparatus of any of Aspects 1 to 7, wherein the one or more motion features comprise attention maps obtained from a last layer of the second query generator network from a final iteration step of a plurality of iteration steps performed by the second query generator network to predict a future motion corresponding to the first feature volume.

Aspect 9. The apparatus of Aspect 8, wherein the second query generator network comprises a reconstruction-aware motion prediction network including a self-attention layer and a plurality of skip-attention module (SAM) layers, and wherein the last layer of the second query generator network comprises a last SAM layer of the plurality of SAM layers.

Aspect 10. The apparatus of any of Aspects 1 to 9, wherein: the first query generator network is a reconstruction-aware query generator machine learning network; and the second query generator network is a motion-aware query generator machine learning network.

Aspect 11. The apparatus of Aspect 10, wherein: the reconstruction-aware query generator machine learning network is configured to generate reconstruction query features corresponding to scene features of a scene represented in the first set of frames; and the motion-aware query generator machine learning network is configured to generate motion query features corresponding to future motion predictions of objects within the scene represented in the first set of frames.

Aspect 12. The apparatus of any of Aspects 1 to 11, wherein, to generate the initial depth prediction, the one or more processors are configured to: cross-attend the features of the depth prediction decoder using the one or more reconstruction features and the one or more motion features to generate cross-attended decoder features; and generate, using the depth prediction decoder, the initial depth prediction based on the cross-attended decoder features.

Aspect 13. The apparatus of Aspect 12, wherein, to generate the refined depth prediction, the one or more processors are configured to: cross-attend, using a depth refinement machine learning network, information associated with the initial depth prediction using the one or more reconstruction features and the one or more motion features to generate cross-attended depth prediction features; and generate, using the depth refinement machine learning network, the refined depth prediction based on the cross-attended depth prediction features.

Aspect 14. The apparatus of any of Aspects 1 to 13, wherein: the one or more reconstruction features associated with cross-attention for the initial depth prediction are the same as the one or more reconstruction features associated with cross-attention for the refined depth prediction; and the one or more motion features associated with cross-attention for the initial depth prediction are the same as the one or more motion features associated with cross-attention for the refined depth prediction.

Aspect 15. The apparatus of any of Aspects 1 to 14, wherein: the first set of frames comprises a first set of consecutive frames of video data between a first time and a second time subsequent to the first time.

Aspect 16. The apparatus of any of Aspects 1 to 15, wherein, to obtain the first feature volume, the one or more processors are configured to: obtain a sequence of frames of video data including the first set of frames; generate, using an encoder, respective visual features corresponding to each frame of the first set of frames; and generate the first feature volume as a concatenation of the respective visual features corresponding to each frame of the first set of frames, wherein the respective visual features are concatenated in a channel dimension.

Aspect 17. The apparatus of any of Aspects 1 to 16, further comprising one or more cameras configured to capture the first set of frames.

Aspect 18. A method for generating depth information, the method comprising: obtaining a first feature volume including visual features corresponding to each respective frame included in a first set of frames; generating, based on the first feature volume and using a first query generator network, one or more reconstruction features associated with a reconstructed feature volume corresponding to the first feature volume; generating, based on the first feature volume and using a second query generator network, one or more motion features associated with predicted future motion corresponding to the first feature volume; generating an initial depth prediction for each respective frame included in the first set of frames, based on cross-attention between features of a depth prediction decoder, the one or more reconstruction features, and the one or more motion features; and generating a refined depth prediction for each respective frame included in the first set of frames, based on cross-attention between the initial depth prediction, the one or more reconstruction features, and the one or more motion features.

Aspect 19. The method of Aspect 18, further comprising: generating, using a depth prediction decoder, the features of the depth prediction decoder, wherein the features of the depth prediction decoder are based on the first feature volume.

Aspect 20. The method of any of Aspects 18 to 19, further comprising: generating, using the first query generator network, an enhanced feature volume based on adaptive masking of the first feature volume; and generating, using a depth prediction decoder, the features of the depth prediction decoder, wherein the features of the depth prediction decoder are based on the enhanced feature volume.

Aspect 21. The method of Aspect 20, wherein the enhanced feature volume is a reconstructed feature volume corresponding to an adaptively masked version of the first feature volume.

Aspect 22. The method of Aspect 21, further comprising: generating the adaptively masked version of the first feature volume using an adaptive sampler machine learning network jointly trained with the first query generator network; and generating the reconstructed feature volume based on reconstructing the first feature volume from the adaptively masked version of the first feature volume using the first query generator network.

Aspect 23. The method of any of Aspects 21 to 22, wherein the one or more reconstruction features are associated with using the first query generator network to reconstruct the first feature volume from the adaptively masked version of the first feature volume.

Aspect 24. The method of any of Aspects 18 to 23, wherein the one or more motion features comprise attention maps obtained from a last layer of the first query generator network, based on processing the first feature volume using the first query generator network.

Aspect 25. The method of any of Aspects 18 to 24, wherein the one or more motion features comprise attention maps obtained from a last layer of the second query generator network from a final iteration step of a plurality of iteration steps performed by the second query generator network to predict a future motion corresponding to the first feature volume.

Aspect 26. The method of Aspect 25, wherein the second query generator network comprises a reconstruction-aware motion prediction network including a self-attention layer and a plurality of skip-attention module (SAM) layers, and wherein the last layer of the second query generator network comprises a last SAM layer of the plurality of SAM layers.

Aspect 27. The method of any of Aspects 18 to 26, wherein: the first query generator network is a reconstruction-aware query generator machine learning network; and the second query generator network is a motion-aware query generator machine learning network.

Aspect 28. The method of Aspect 27, wherein: the reconstruction-aware query generator machine learning network is configured to generate reconstruction query features corresponding to scene features of a scene represented in the first set of frames; and the motion-aware query generator machine learning network is configured to generate motion query features corresponding to future motion predictions of objects within the scene represented in the first set of frames.

Aspect 29. The method of any of Aspects 18 to 28, wherein generating the initial depth prediction comprises: cross-attending the features of the depth prediction decoder using the one or more reconstruction features and the one or more motion features to generate cross-attended decoder features; and generating, using the depth prediction decoder, the initial depth prediction based on the cross-attended decoder features.

Aspect 30. The method of Aspect 29, wherein generating the refined depth prediction comprises: cross-attending, using a depth refinement machine learning network, information associated with the initial depth prediction using the one or more reconstruction features and the one or more motion features to generate cross-attended depth prediction features; and generating, using the depth refinement machine learning network, the refined depth prediction based on the cross-attended depth prediction features.

Aspect 31. The method of any of Aspects 18 to 30, wherein: the one or more reconstruction features associated with cross-attention for the initial depth prediction are the same as the one or more reconstruction features associated with cross-attention for the refined depth prediction; and the one or more motion features associated with cross-attention for the initial depth prediction are the same as the one or more motion features associated with cross-attention for the refined depth prediction.

Aspect 32. The method of any of Aspects 18 to 31, wherein: the first set of frames comprises a first set of consecutive frames of video data between a first time and a second time subsequent to the first time.

Aspect 33. The method of any of Aspects 18 to 32, wherein obtaining the first feature volume comprises: obtaining a sequence of frames of video data including the first set of frames; generating, using an encoder, respective visual features corresponding to each frame of the first set of frames; and generating the first feature volume as a concatenation of the respective visual features corresponding to each frame of the first set of frames, wherein the respective visual features are concatenated in a channel dimension.

Aspect 34. The method of any of Aspects 18 to 33, further comprising using one or more cameras configured to capture the first set of frames.

Aspect 35. A non-transitory computer-readable storage medium comprising instructions stored thereon which, when executed by at least one processor, causes the at least one processor to perform operations according to any of Aspects 1 to 17.

Aspect 36. A non-transitory computer-readable storage medium comprising instructions stored thereon which, when executed by at least one processor, causes the at least one processor to perform operations according to any of Aspects 18 to 34.

Aspect 37. An apparatus comprising one or more means for performing operations according to any of Aspects 1 to 17.

Aspect 38. An apparatus comprising one or more means for performing operations according to any of Aspects 18 to 34.

What is claimed is:

1. An apparatus for generating depth information, the apparatus comprising:

one or more memories configured to store a first set of frames; and one or more processors coupled to the one or more memories, the one or more processors being configured to:

obtain a first feature volume including visual features corresponding to each respective frame included in the first set of frames;

generate, based on the first feature volume and using a first query generator network, one or more reconstruction features associated with a reconstructed feature volume corresponding to the first feature volume;

generate, based on the first feature volume and using a second query generator network, one or more motion features associated with predicted future motion corresponding to the first feature volume;

generate an initial depth prediction for each respective frame included in the first set of frames, based on cross-attention between features of a depth prediction decoder, the one or more reconstruction features, and the one or more motion features; and generate a refined depth prediction for each respective frame included in the first set of frames, based on cross-attention between the initial depth prediction, the one or more reconstruction features, and the one or more motion features.

2. The apparatus of claim 1, wherein the one or more processors are configured to:

generate, using a depth prediction decoder, the features of the depth prediction decoder, wherein the features of the depth prediction decoder are based on the first feature volume.

3. The apparatus of claim 1, wherein the one or more processors are configured to:

generate, using the first query generator network, an enhanced feature volume based on adaptive masking of the first feature volume; and generate, using a depth prediction decoder, the features of the depth prediction decoder, wherein the features of the depth prediction decoder are based on the enhanced feature volume.

4. The apparatus of claim 3, wherein the enhanced feature volume is a reconstructed feature volume corresponding to an adaptively masked version of the first feature volume.

5. The apparatus of claim 4, wherein the one or more processors are configured to:

generate the adaptatively masked version of the first feature volume using an adaptive sampler machine learning network jointly trained with the first query generator network; and generate the reconstructed feature volume based on reconstructing the first feature volume from the adaptatively masked version of the first feature volume using the first query generator network.

6. The apparatus of claim 4, wherein the one or more reconstruction features are associated with using the first query generator network to reconstruct the first feature volume from the adaptively masked version of the first feature volume.

7. The apparatus of claim 1, wherein the one or more motion features comprise attention maps obtained from a last layer of the first query generator network, based on processing the first feature volume using the first query generator network.

8. The apparatus of claim 1, wherein the one or more motion features comprise attention maps obtained from a last layer of the second query generator network from a final iteration step of a plurality of iteration steps performed by the second query generator network to predict a future motion corresponding to the first feature volume.

9. The apparatus of claim 8, wherein the second query generator network comprises a reconstruction-aware motion prediction network including a self-attention layer and a plurality of skip-attention module (SAM) layers, and wherein the last layer of the second query generator network comprises a last SAM layer of the plurality of SAM layers.

10. The apparatus of claim 1, wherein:

the first query generator network is a reconstruction-aware query generator machine learning network; and the second query generator network is a motion-aware query generator machine learning network.

11. The apparatus of claim 10, wherein:

the reconstruction-aware query generator machine learning network is configured to generate reconstruction query features corresponding to scene features of a scene represented in the first set of frames; and the motion-aware query generator machine learning network is configured to generate motion query features corresponding to future motion predictions of objects within the scene represented in the first set of frames.

12. The apparatus of claim 1, wherein, to generate the initial depth prediction, the one or more processors are configured to:

cross-attend the features of the depth prediction decoder using the one or more reconstruction features and the one or more motion features to generate cross-attended decoder features; and generate, using the depth prediction decoder, the initial depth prediction based on the cross-attended decoder features.

13. The apparatus of claim 12, wherein, to generate the refined depth prediction, the one or more processors are configured to:

cross-attend, using a depth refinement machine learning network, information associated with the initial depth prediction using the one or more reconstruction features and the one or more motion features to generate cross-attended depth prediction features; and generate, using the depth refinement machine learning network, the refined depth prediction based on the cross-attended depth prediction features.

14. The apparatus of claim 1, wherein:

the one or more reconstruction features associated with cross-attention for the initial depth prediction are the same as the one or more reconstruction features associated with cross-attention for the refined depth prediction; and the one or more motion features associated with cross-attention for the initial depth prediction are the same as the one or more motion features associated with cross-attention for the refined depth prediction.

15. The apparatus of claim 1, wherein:

the first set of frames comprises a first set of consecutive frames of video data between a first time and a second time subsequent to the first time.

16. The apparatus of claim 1, wherein, to obtain the first feature volume, the one or more processors are configured to:

obtain a sequence of frames of video data including the first set of frames;

generate, using an encoder, respective visual features corresponding to each frame of the first set of frames; and generate the first feature volume as a concatenation of the respective visual features corresponding to each frame of the first set of frames, wherein the respective visual features are concatenated in a channel dimension.

17. The apparatus of claim 1, further comprising one or more cameras configured to capture the first set of frames.

18. A method for generating depth information, the method comprising:

obtaining a first feature volume including visual features corresponding to each respective frame included in a first set of frames;

generating, based on the first feature volume and using a first query generator network, one or more reconstruction features associated with a reconstructed feature volume corresponding to the first feature volume;

generating, based on the first feature volume and using a second query generator network, one or more motion features associated with predicted future motion corresponding to the first feature volume;

generating an initial depth prediction for each respective frame included in the first set of frames, based on cross-attention between features of a depth prediction decoder, the one or more reconstruction features, and the one or more motion features; and generating a refined depth prediction for each respective frame included in the first set of frames, based on cross-attention between the initial depth prediction, the one or more reconstruction features, and the one or more motion features.

19. The method of claim 18, further comprising:

generating, using a depth prediction decoder, the features of the depth prediction decoder, wherein the features of the depth prediction decoder are based on the first feature volume.

20. The method of claim 18, further comprising:

generating, using the first query generator network, an enhanced feature volume based on adaptive masking of the first feature volume; and generating, using a depth prediction decoder, the features of the depth prediction decoder, wherein the features of the depth prediction decoder are based on the enhanced feature volume.

*   *   *   *   *